United States Patent
Sugita

[19]

[11] Patent Number: 5,910,964
[45] Date of Patent: *Jun. 8, 1999

[54] CODE DETECTION APPARATUS

[75] Inventor: Takehiro Sugita, Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/598,943

[22] Filed: Feb. 9, 1996

[30] Foreign Application Priority Data

Feb. 10, 1995  [JP]  Japan ................................. 7-022912

[51] Int. Cl.$^6$ ........................................................ H04B 7/26
[52] U.S. Cl. .......................... 375/200; 375/208; 370/208
[58] Field of Search .................................. 375/200, 208; 370/206, 208, 335, 342

[56] References Cited

U.S. PATENT DOCUMENTS

| | | | |
|---|---|---|---|
| 4,901,307 | 2/1990 | Gilhousen et al. ..................... | 370/320 |
| 5,442,627 | 8/1995 | Viterbi et al. ............................ | 370/209 |
| 5,465,269 | 11/1995 | Schaffner et al. ....................... | 375/200 |
| 5,488,629 | 1/1996 | Takahashi et al. ...................... | 375/206 |
| 5,490,165 | 2/1996 | Blakeney, II et al. .................. | 375/205 |
| 5,559,790 | 9/1996 | Yano et al. .............................. | 370/342 |
| 5,576,715 | 11/1996 | Litton et al. ............................ | 342/357 |
| 5,577,022 | 11/1996 | Padovani et al. ................... | 375/208 X |
| 5,577,025 | 11/1996 | Skinner et al. ......................... | 370/209 |
| 5,615,226 | 3/1997 | Lipa ........................................ | 375/200 |
| 5,621,752 | 4/1997 | Antonio et al. ........................ | 375/200 |
| 5,629,956 | 5/1997 | Durrant et al. ......................... | 375/208 |
| 5,644,591 | 7/1997 | Sutton .................................... | 375/200 |

*Primary Examiner*—Young T. Tse
*Attorney, Agent, or Firm*—Jay H. Maioli

[57] ABSTRACT

A code detection apparatus, comprised of a unit for orthogonally detecting a spread spectrum modulated reception signal, a unit for applying phase compensation to the orthogonally detected signal components to produce orthogonal signals (I, Q), a unit for cumulatively adding the phase compensated orthogonal signals (I, Q) a predetermined number of times, a unit for generating square sums $(\Sigma I)^2 + (\Sigma Q)^2$ of the cumulatively added values of the orthogonal signals (I, Q), and a unit for detecting the code of the spread spectrum modulated reception signal based on the generated and output square sums $(\Sigma I)^2 + (\Sigma Q)^2$ obtained by changing the amount of the phase compensation in order to improve detection of synchronization.

8 Claims, 13 Drawing Sheets

1

WHERE CALCULATION OF POWER IS CARRIED OUT AFTER
CONTINUOUS CUMULATIVE ADDITION FOR 64 CHIPS

WHERE CALCULATION OF POWER IS CARRIED
OUT FOR EVERY 64 CHIPS AND ADDED EIGHT TIMES

WHERE IT IS ADDED CONTINUOUSLY FOR 512
CHIPS AND POWER IS CALCULATED

1

CODE DETECTION APPARATUS

BACKGROUND OF THE INVENTION

1. Field of the Invention

The present invention relates to a code detection apparatus, which detects spectrum-spread codes contained in a pilot signal to be transmitted by a base station in each cellular zone in a code division multiple access (CDMA) cellular type communication system and communication systems equivalent to this.

2. Description of the Related Art

In the CDMA cellular type communication system, a pilot signal (pilot channel) modulated by a spectrum-spread code (PN code) is constantly transmitted from a base station in a cellular zone. Such pilot signal is used for detecting and maintaining the synchronization at a mobile unit(s). As the pilot signal, two types of PN codes $pn_i$ and $pn_q$ of the same cycles and different pseudo random number sequences are used.

However, when establishing synchronization between a base station and a mobile unit, at the initial stage thereof, there are cases where the transmission carrier signal frequency $\omega_1$ on the base station side and the reception carrier frequency $\omega_2$ on the mobile unit side deviate from each other. In such a case, the error in the calculations for the synchronization processing becomes larger and the detection of synchronization and the holding thereof sometimes cannot be carried out well.

SUMMARY OF THE INVENTION

The present invention is intended to overcome this disadvantage of the related art and an object of the present invention is to provide a code detection apparatus and method which can reduce the calculation error in the initial stage of the processing for detection of synchronization between a base station and a mobile unit of a CDMA cellular type communication system in order to detect and maintain the synchronization well.

Another object of the present invention is to provide a code detection apparatus and method which can perform the code detection at a high speed.

A still other object of the present invention is to provide a code detection apparatus and method which can perform the code detection with a low power consumption.

So as to achieve the above objects, the present invention provides a code detection apparatus, comprising: means for orthogonally detecting a spread spectrum modulated reception signal, means for applying phase compensation to the orthogonally detected signal components to produce orthogonal signals (I, Q), means for cumulatively adding the phase compensated orthogonal signals (I, Q) a predetermined number of times, means for generating square sums $(\Sigma I)^2+(\Sigma Q)^2$ of the cumulatively added values of the orthogonal signals (I, Q), and means for detecting the code of the spread spectrum modulated reception signal based on the generated and output square sums $(\Sigma I)^2+(\Sigma Q)^2$ obtained by changing the amount of the phase compensation.

Preferably, phase compensation is applied to the orthogonally detected signal components and orthogonal signals (I, Q) are generated based on the phase compensated signal components.

Alternatively, preferably orthogonal signals (I, Q) are generated with respect to orthogonally detected signal components and phase compensation is applied to the thus generated orthogonal signals (I, Q).

Alternatively, preferably, the generated and output square sums $(\Sigma I)^2+(\Sigma Q)^2$ generated by changing the amounts of the phase compensation are stored, the maximum value of the generated and output square sums $(\Sigma I)^2+(\Sigma Q)^2$ which are stored is selected, and the code of the spread spectrum modulated reception signal is detected in accordance with that selected output.

Alternatively, preferably, a plurality of phase compensation amounts are simultaneously given to the orthogonal signals (I, Q), the square sums $(\Sigma I)^2+(\Sigma Q)^2$ of the same are generated and output from the phase compensated orthogonal signals (I, Q), the maximum value of the generated and output square sums $(\Sigma I)^2+(\Sigma Q)^2$ is selected, and the code of the spread spectrum modulated reception signal is detected in accordance with that selected output.

Alternatively, preferably, a plurality of phase compensation amounts are simultaneously given to the orthogonally detected signal components, the square sums $(\Sigma I)^2+(\Sigma Q)^2$ of the same are generated and output based on the phase compensated orthogonally detected signal components, the maximum value of the generated and output square sums $(\Sigma I)^2+(\Sigma Q)^2$ is selected, and the code of the spread spectrum modulated reception signal is detected in accordance with that selected output.

Alternatively, preferably, the amount of change for the phase compensation is in units of $\pi/2$ (rad).

Alternatively, preferably, the amount of change for the phase compensation is in units of $\pi/2$ (rad) and the codes of the orthogonally detected orthogonal signal components are inverted in accordance with the $\pi/2$ (rad) phase change.

Alternatively, preferably, the amount of change for the phase compensation is in units of $\pi/2$ and the codes of the orthogonal signals are inverted in accordance with the $\pi/2$ (rad) phase change.

According to a second aspect of the invention, there is provided a code detection method wherein a spread spectrum modulated reception signal is orthogonally detected, phase compensation is applied to the orthogonally detected signal components, orthogonal signals (I, Q) are produced, the phase compensated orthogonal signals (I, Q) are cumulatively added a predetermined number of times, square sums $(\Sigma I)^2+(\Sigma Q)^2$ of the cumulatively added values of the orthogonal signals (I, Q) are generated, and the code of the spread spectrum modulated reception signal is detected based on the generated and output square sums $(\Sigma I)^2+(\Sigma Q)^2$ obtained by changing the amount of the phase compensation.

BRIEF DESCRIPTION OF THE DRAWINGS

These and other objects and features of the present invention will become clearer from the following description of the preferred embodiments made with reference to the accompanying drawings, in which.

DESCRIPTION OF THE PREFERRED EMBODIMENTS

The code detection apparatus according to the present invention basically comprises a phase rotating means for rotating the phases of a set of orthogonal signal components contained in a spectrum spread-modulated reception signal by a predetermined phase rotation angle so as to cancel the phase rotations among the set of orthogonal signal components to generate orthogonal signals; a cumulative adding means for cumulatively adding each of the orthogonal signals a predetermined number of times to calculate a cumulatively added value; a square sum calculating means for squaring the cumulatively added value of each of the orthogonal signals to calculate a square value and adding the square values of the orthogonal signals rotated in phase by the same phase rotation values to calculate a square sum corresponding to each of the predetermined phase rotation angles; and a code detecting means for detecting the maximum value among the square sums corresponding to the predetermined phase rotation angles as a code.

The phase rotating means rotates the phases of a set of orthogonal signals by a predetermined phase rotation value so as to cancel the phase rotation of a set of orthogonal signal components (orthogonal components $r_i$ and $r_q$ or orthogonal signals $I_i$ and $I_q$) contained in a reception signal and outputs the resultant signals as the orthogonal signals I and Q or the phase-rotated orthogonal signals $I_p$ and $Q_p$.

The cumulative adding means cumulatively adds the orthogonal signals (orthogonal signals I and Q or orthogonal signals $I_p$ and $Q_p$) corresponding to each of the set of orthogonal signal components rotated in phase by the predetermined phase rotation angle by the phase rotating means a predetermined number of times, respectively.

The square sum calculating means squares the cumulatively added values calculated by the cumulative adding means, adds a set of square values corresponding to a set of orthogonal signal components rotated in phase by the same phase rotation angle among these square values, and calculates the square sums (energy values $(\Sigma I)^2+(\Sigma Q)^2$ or energy values $(\Sigma I_p)^2+(\Sigma Q_p)^2$) corresponding to the predetermined phase rotation angles for every cycle of the orthogonal signal.

The code detecting means detects the maximum value of the square sums corresponding to the phase rotation angle and outputs the same as the detection code.

FIRST EMBODIMENT

A first embodiment of the present invention will be explained below.

In a CDMA cellular communication system, not voice data etc., but a signal called a pilot signal modulated by only a spread code (PN code) is constantly transmitted from the base station. This pilot signal is used for detecting and holding synchronization by the mobile unit.

Figure 1:
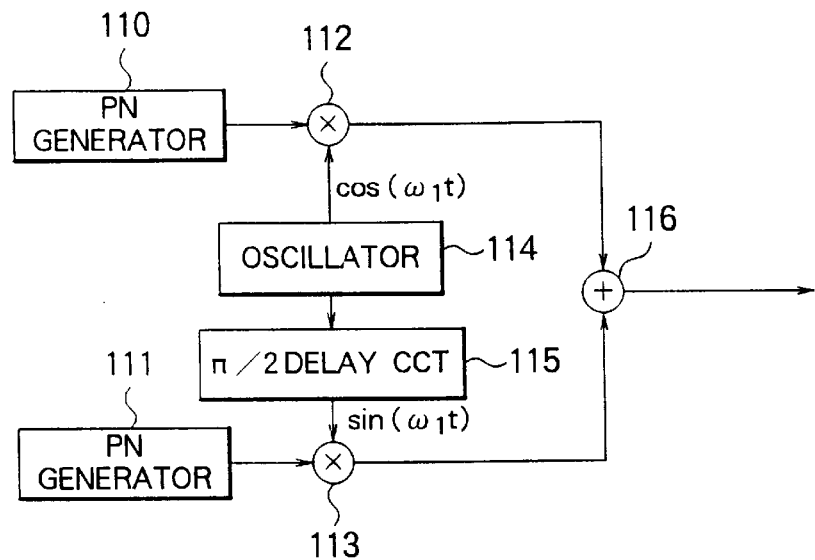
FIG. 1 is view explaining the process of generation of a pilot signal to be used in a CDMA cellular communication system.

FIG. 1 is a view explaining the process of generation of the above-mentioned pilot signal.

AS shown in FIG. 1, the transmission unit of the base station includes two types of PN generators 110 and 111. These two types of PN generators 110 and 111 generate codes of the same cycles and different pseudo random number sequences.

The PN code generated by the PN generator 110 is multiplied with the output of an oscillator 114 by a multiplier 112. The PN code generated by the PN generator 111 is multiplied with the carrier signal obtained by delaying the output of the oscillator 114 by a ¼ cycle in a $\pi/2$ delay unit 115 by a multiplier 113. The results of the multiplications in the multipliers 112 and 113 are added by an adder 116 and the result is output as a transmission signal.

Below, an explanation will be made of the processing from when the pilot signal (transmission signal s(t)) generated by the base station is received by the mobile unit to when the code is reproduced.

When designating the PN code generated by the PN generator 110 of the transmission unit of the base station as the code $pn_i(t)$, designating the PN code generated by the PN generator 111 as the code $pn_q(t)$, and designating the output signal of the oscillator 114 as a carrier signal $\cos(\omega t)$, the transmission signal s(t) is expressed by the following equation 1.

$$s(t) = pn_i(t)\cdot\cos(\omega t) + pn_q(t)\cdot\sin(\omega t) \qquad (1)$$

When the angular frequency of the carrier signal generated by the oscillator 114 of the base station transmission unit shown in FIG. 1 is designated as the angular frequency $\omega_1$, the phase thereof is designated as the phase $\psi$, and the gain is designated as the gain $a_0$, the transmission signal s(t) of the base station is expressed by the following equation 2.

$$s(t) = a_0(pn_i(t)\cdot\cos(\omega_1 t + \psi)) + pn_q(t)\cdot\sin(\omega_1 t + \psi)) \qquad (2)$$

The transmission signal s(t) shown in Equation 2 attenuates due to the propagation loss of the transmission path. When designating the transmission signal r(t) (reception signal r(t)) at the reception point (mobile unit) as the constant $a_1$ considering the attenuation, this is expressed by the following equation 3.

$$r(t) = a_i(pn_i(t) \cdot \cos(\omega_1 t + \psi)) + pn_q(t) \cdot \sin(\omega_1 t + \psi)) \quad (3)$$

The reception signal r(t) expressed by the equation 3 is multiplied by the carrier signals $\cos(\omega_2 t)$ and $\sin(\omega_2 t)$ having a phase difference of $\pi/2$ (rad), respectively, to obtain the orthogonal components $r_i$ and $r_q$ expressed by the following equations 4 and 5.

$$r_i = a_i(pn_i(t) \cdot \cos(\omega_1 t + \psi) \cdot \cos(\omega_2 t) + pn_q(t) \cdot \sin(\omega_1 t + \psi) \cdot \cos(\omega_2 t)) \quad (4)$$

$$r_i = a_i(pn_i(t) \cdot \cos(\omega_1 t + \psi) \cdot \sin(\omega_2 t) + pn_q(t) \cdot \sin(\omega_1 t + \psi) \cdot \sin(\omega_2 t)) \quad (5)$$

The baseband components $r_i$ and $r_q$ remaining after removing the high frequency components from these orthogonal components $r_i$ and $r_q$ by a low-pass filter become as shown in the following equations 6 and 7.

$$r_i = a_i(pn_i(t) \cdot \cos(\omega_1 t + \psi - \omega_2 t) + pn_q(t) \cdot \sin(\omega_1 t + \psi - \omega_2 t)) \quad (6)$$

$$r_q = a_i(-pn_i(t) \cdot \sin(\omega_1 t + \psi - \omega_2 t) + pn_q(t) \cdot \cos(\omega_1 t + \psi - \omega_2 t)) \quad (7)$$

Next, the orthogonal signals I and Q are generated by values of the codes $pn_i(t)$ and $pn_q(t)$ as shown in the following equations 8 and 9.

$$I = r_i \cdot pn_i(t)$$
$$Q = r_q \cdot pn_q(t) \quad (8)$$

Note, that $pn_i(t)$ is equal to $pn_q(t)$.

$$I = r_q \cdot pn_q(t)$$
$$Q = r_i \cdot pn_i(t) \quad (9)$$

Note, that $pn_i(t)$ is not equal to $pn_q(t)$.

As a result, the two orthogonal signals I and Q shown in the following equations 10 and 11 are obtained.

$$I = a_1(\cos(\omega_1 t + \psi - \omega_2 t) + \sin(\omega_1 t + \psi - \omega_2 t)) \quad (10)$$

$$Q = a_1(\cos(\omega_1 t + \psi - \omega_2 t) - \sin(\omega_1 t + \psi - \omega_2 t)) \quad (11)$$

Finding the energy $(I^2 + Q^2)/2$ of the orthogonal signal, it becomes as shown in the following equation 12.

$$\begin{aligned} r_e &= (I^2 + Q^2)/2 \\ &= a_1^2(\cos^2(\omega_1 t - \psi - \omega_2 t) + 2\cos(\omega_1 t + \psi - \omega_2 t) \cdot \\ &\quad \sin(\omega_1 t + \psi - \omega_2 t) + \sin^2(\omega_1 t + \psi - \omega_2 t) + \\ &\quad \cos^2(\omega_1 t + \psi - \omega_2 t) - 2\cos(\omega_1 t + \psi - \omega_2 t) \cdot \\ &\quad \sin(\omega_1 t + \psi - \omega_2 t) + \sin^2(\omega_1 t + \psi - \omega_2 t))/2 \\ &= a_1^2(2\cos^2(\omega_1 t + \psi - \omega_2 t) + 2\sin^2(\omega_1 t + \psi - \omega_2 t))/2 \\ &= a_1^2 \end{aligned} \quad (12)$$

Figure 2:
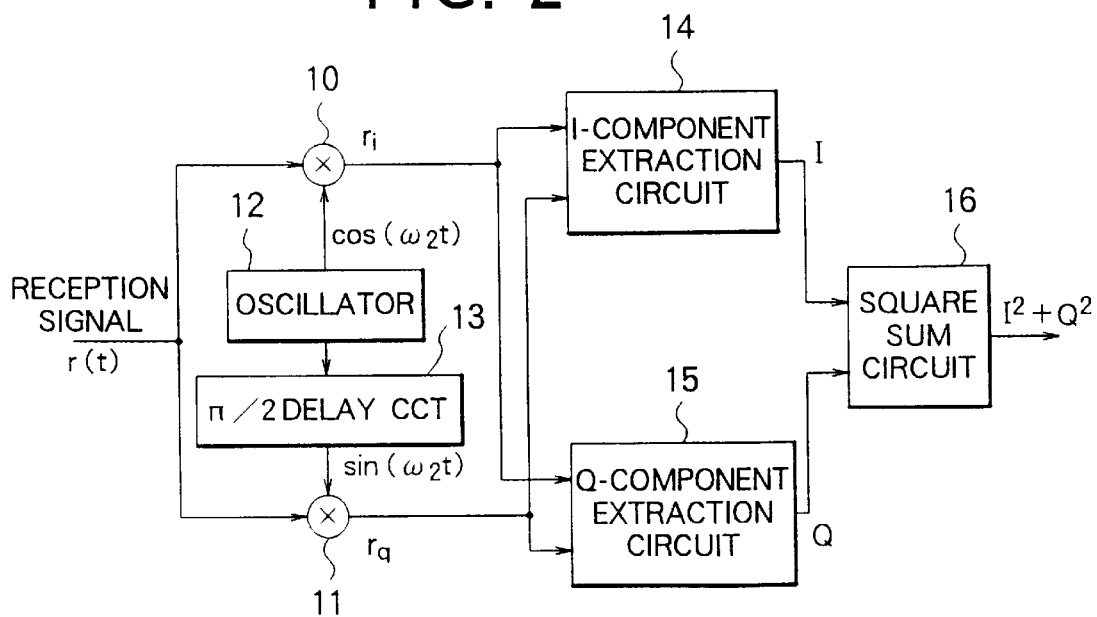
FIG. 2 is a view showing a circuit for realizing processing on a mobile unit side receiving the pilot signal generated by the process of generation shown in FIG. 1.

FIG. 2 is a view showing a circuit which realizes the processing on the mobile unit side mentioned above.

The reception signal r(t) is input to the first input terminals of the multipliers 10 and 11. A carrier signal $\cos(\omega_2 t)$ generated by the oscillator 12 is directly input to the second input terminal of the multiplier 10, and a carrier signal $\sin(\omega_2 t)$ delayed in phase exactly by $\pi/2$(rad) (¼ cycle) by the $\pi/2$ phase delay circuit 13 is input to the second input terminal of the multiplier 11. The multipliers 10 and 11 respectively multiply their two input two signals and output the orthogonal components $r_i$ and $r_q$.

The I-component extraction circuit 14 and the Q-component extraction circuit 15 generate the orthogonal signals I and Q from the multiplication signals $r_i$ and $r_q$ by the above-mentioned method, respectively.

The square sum circuit 16 calculates the energy values $(I^2 + Q^2)/2$ of the orthogonal signals I and Q from them.

The energy values $(I^2 + Q^2)/2$ of the orthogonal signals I and Q found in the above-mentioned way have a low ratio to noise for a single chip. Accordingly, in actuality, the circuit shown in FIG. 3 which realizes the spectral reverse spread is used. The point of difference of the circuit shown in FIG. 3 from the circuit shown in FIG. 2 resides in the fact that the square sums are calculated after cumulatively adding the orthogonal signals I and Q.

Figure 3:
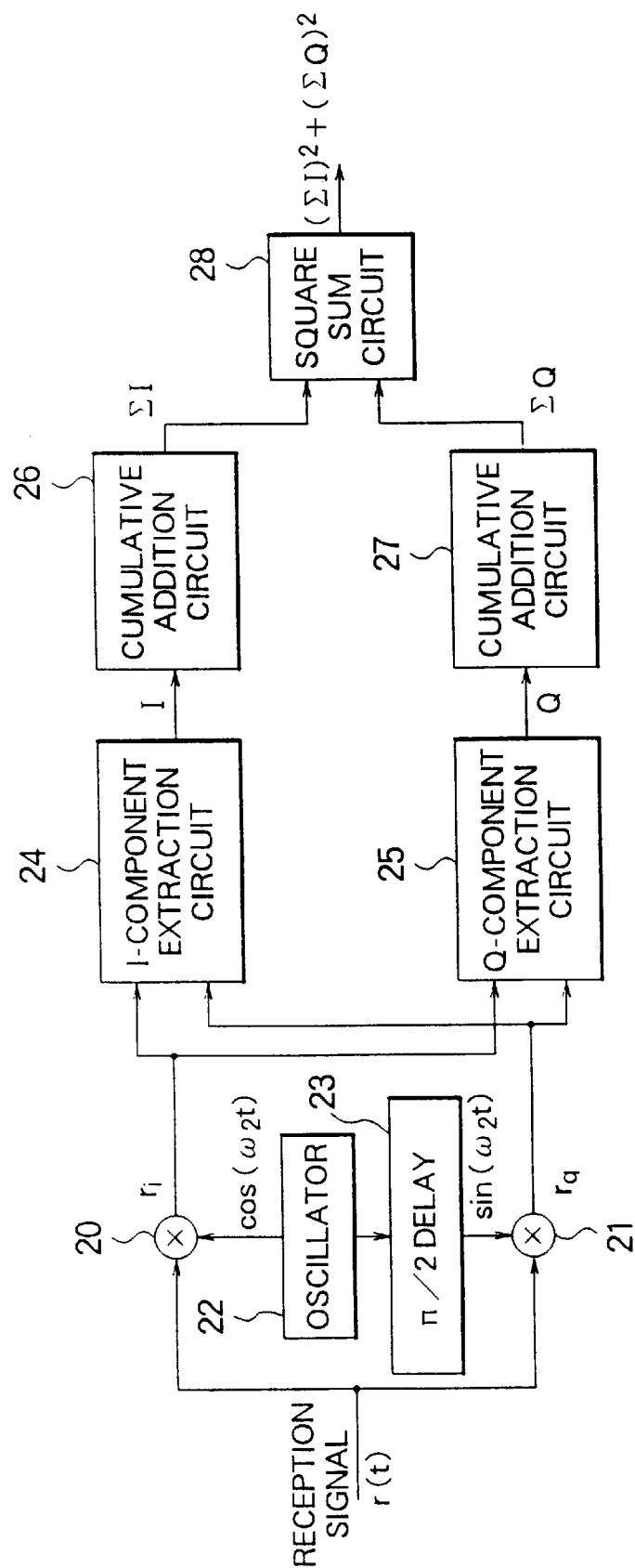
FIG. 3 is a circuit for enhancing the code detection characteristic of the circuit shown in FIG. 2.

In the circuit shown in FIG. 3, the reception signal r(t) is input to the multipliers 20 and 21 similar to the circuit shown in FIG. 2, multiplied with the carrier signal cos(ωt) generated by the oscillator 22 and a carrier signal sin(ωt) delayed in phase exactly by $\pi/2$ (rad) by the $\pi/2$ phase delay circuit 23, respectively, so the orthogonal components $r_i$ and $r_q$ are generated.

The I-component extraction circuit 24 and the Q-component extraction circuit 25 generate orthogonal signals I and Q from the orthogonal components $r_i$ and $r_q$, respectively.

The orthogonal signals I and Q are cumulatively added by the cumulative addition circuits 26 and 27, respectively, to generate cumulatively added signals $\Sigma I$ and $\Sigma Q$.

The square sum circuit 28 squares the cumulatively added signals $\Sigma I$ and $\Sigma Q$ to calculate the energy values $(\Sigma I)^2 + (\Sigma Q)^2$ thereof.

Here, where the carrier frequencies on the transmission side and reception side are equal ($\omega_1 = \omega_2$ in the equations shown above), equations 10 and 11 become as shown in the following equations 13 and 14.

$$I = a_1(\cos(\psi) + \sin(\psi)) \quad (13)$$

$$Q = a_1(\cos(\psi) - \sin(\psi)) \quad (14)$$

In the cases shown in equations 13 and 14, the orthogonal signals I and Q on the reception side become constant values not dependent on the elapse of time. Accordingly, the energy values E' of the orthogonal signals I and Q calculated in the circuit of FIG. 3 become like that in the following equation 15.

$$\begin{aligned} E' &= \left(\left(\sum I/n\right)^2 + \left(\sum Q/n\right)^2\right)/2 \\ &= \left(\left(\sum (a_1(\cos(\psi) - \sin(\psi)))/n\right)^2 + \left(\sum (a_1(\sin(\psi) + \cos(\psi))/n)^2\right)\right)/2 \\ &= a_1^2((\cos(\psi) - \sin(\psi))^2 + (\sin(\psi) + \cos(\psi))^2/2 \\ &= a_1^2 \end{aligned} \quad (15)$$

In this way, where the frequencies $\omega_1$ and $\omega_2$ of the two carrier signals of the transmission side and the reception side are equal, the result of equation 15 and the result of equation 12 coincide.

However, where the frequencies $\omega_1$ and $\omega_2$ of the carrier signals on the transmission side and the reception side are different ($\omega_1$ is not equal to $\omega_2$), a component obtained by multiplying signal components at different times with each other, such as $\cos(\omega_1 t_i + \psi - \omega_2 t_i) \cdot \sin(\omega_1 t_j + \psi - \omega_2 t_j)$ is produced in the energy values E'. This component cannot be cancelled, and therefore the results of equations 12 and 15 do not coincide and an error will be produced between these results.

For this reason, an error produced when the frequencies $\omega_1$ and $\omega_2$ of the carrier signals on the transmission side and reception side differ ($\omega_1$ is not equal to $\omega_2$) becomes larger as the difference of frequencies of the carrier signals $\omega_1$ and $\omega_2$ becomes larger.

Where the circuits on the reception side shown in FIG. 2 and FIG. 3 operate in synchronization with the reception signal r(t), the difference of the frequencies $\omega_1$ and $\omega_2$ of the carrier signals becomes sufficiently small, and therefore the error becomes extremely small. However, in a case immediately after the reception side starts the reception and where the synchronization with the transmission side has not been established, the difference between the frequencies $\omega_1$ and $\omega_2$ of the carrier signals sometimes becomes large.

By way of reference, although depending on the values of the carrier signals $\omega_1$ and $\omega_2$, the difference between them must be lowered to 0.5 ppm at a maximum, preferably 0.2 ppm or less, in the frequency band where a CDMA cellular communication system is usually used.

However, provision of such a high precision oscillator inside a mobile unit considerably raises the costs of the mobile unit and therefore this is not realistic.

Also, in the circuit shown in FIG. 3, if the number of cumulative additions of the orthogonal signals I and Q is reduced, the spread gain, which is the characteristic feature of the spread spectrum communication system, cannot be actively utilized and therefore the error produced in the energy values of the cumulatively added signals $\Sigma$I and $\Sigma$Q which are calculated in the processing shown in equation 15 becomes large.

Figure 4:
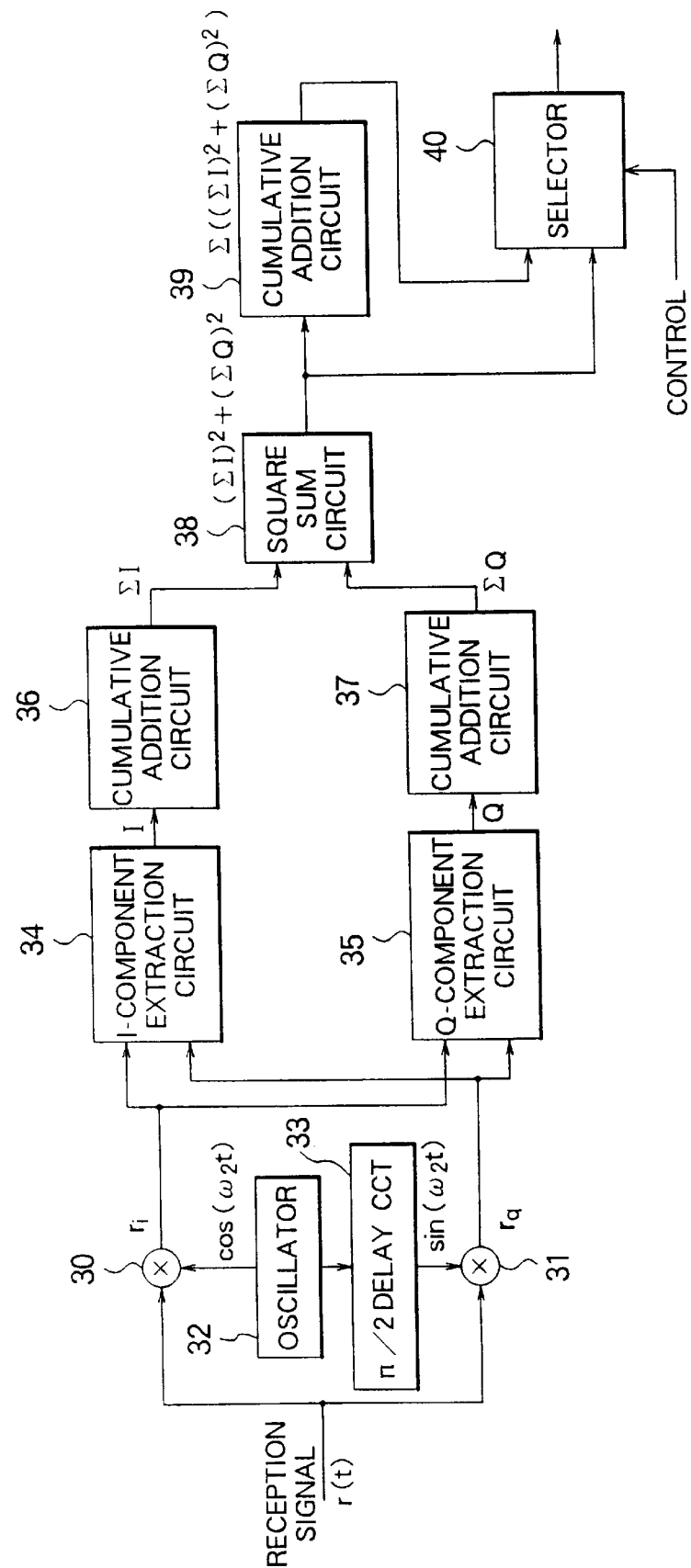
FIG. 4 is a circuit for enhancing the code detection characteristic of the circuit shown in FIG. 3.

FIG. 4 is a view of a circuit on the reception side in which said disadvantage is overcome.

In the circuit shown in FIG. 4, the multipliers 30 and 31, oscillator 32, $\pi/2$ phase delay circuit 33, I-component extraction circuit 34, Q-component extraction circuit 35, cumulative addition circuits 36 and 37, and the square sum circuit 38 calculate the energy values $(\Sigma I)^2 + (\Sigma Q)^2$ of the cumulatively added signals $\Sigma$I and $\Sigma$Q from the reception signal r(t) similar to the circuit shown in FIG. 3.

The cumulative addition circuit 39 further cumulatively adds the energy values $(\Sigma I)^2 + (\Sigma Q)^2$ to calculate the cumulatively added energy values $\Sigma ((\Sigma I)^2 + (\Sigma Q)^2)$.

The selection unit 40 is constituted by a CPU of a computer etc., selects either the output signal of the square sum circuit 38 (energy values $(\Sigma I)^2 + (\Sigma Q)^2$) or the output signal of the cumulative addition circuit 39 (cumulatively added energy values $\Sigma ((\Sigma I)^2 + (\Sigma Q)^2)$) according to the following instructions of the CPU etc. and outputs the same as the code output signal.

In the circuit shown in FIG. 3, to detect the PN code from the reception signal with a high precision, the number of times of cumulative addition in the cumulative addition circuits 26 and 27 must be increased to for example 512 (for 512 chip sections). However, where there is an error in the carrier signal frequencies $\omega_1$ and $\omega_2$ on the reception side and transmission side, an error is generated if the number of times of cumulative addition is increased.

On the other hand, in the circuit shown in FIG. 4, the cumulative addition circuits 36, 37, and 39 are provided before and after the square sum circuit 38. When it is assumed that the number of times of cumulative addition in the cumulative addition circuits 36 and 37 is for example 64 and the number of times of cumulative addition in the cumulative addition circuit 39 is for example 8, a precision the same as that in the case where the number of times of cumulative addition of the cumulative addition circuits 26 and 27 is set to 512 in the circuit shown in FIG. 3 can be obtained.

That is, by reduced the number of times of cumulative addition in the cumulative addition circuits 36 and 37 to as small as 64, the deterioration derived from the error or difference of the carrier wave frequencies $\omega_1$ and $\omega_2$ on the transmission side and the reception side is reduced. Although a sufficient ratio to noise cannot be obtained with the limited number of cumulative additions (64) in the cumulative addition circuits 36 and 37, it is possible to improve the ratio to noise by further cumulatively adding eigth more times in the third cumulative adition circuit 39. The CPU etc. of the selector 40 selects the output signal of the square sum circuit 38 as the code output signal where a sufficient ratio to noise is obtained by the output signal of the square sum circuit 38 and selects the output signal of the cumulative addition circuit 39 as the code output signal where a sufficient ratio to noise cannot be obtained.

The number of times of cumulative addition of the cumulative addition circuits 36 and 37 and the number of times of cumulative addition of the cumulative addition circuit 39 are determined according to the error or difference of the carrier signal frequencies $\omega_1$ and $\omega_2$ which is expected, the required ratio to noise, and power consumption and cannot be given as fixed values.

At the time of activation of the mobile unit, synchronization has not been established with respect to the reception signal, therefore a difference is produced in the carrier frequencies $\omega_1$ and $\omega_2$ between the base station and mobile unit. In this case, in the circuit shown in FIG. 4, the selector 40 will select and output the output signal of the cumulative addition circuit 39.

After the mobile unit starts the demodulation of the reception signal and the synchronization is established, the difference between the carrier frequencies $\omega_1$ and $\omega_2$ of the base station and the mobile unit has become sufficiently small, and therefore it is sufficient so far as the selector 40 selects and outputs the output signal of the square sum circuit 38.

In the circuit shown in FIG. 4, the number of times of cumulative addition of the square sum circuit 38 becomes very small compared with the circuit shown in FIG. 3, and therefore the power consumption is small.

Figure 5A:
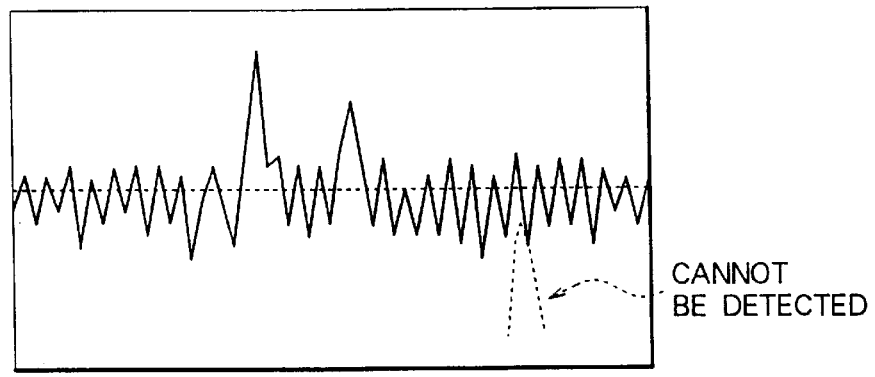
FIG. 5A to 5C are graphs showing the detection characteristic of a PN code according to the circuit shown in FIG. 4.
Figure 5B:
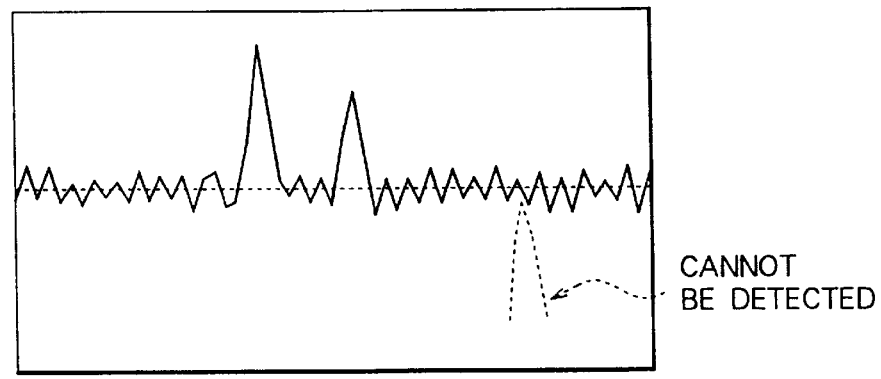
Figure 5C:
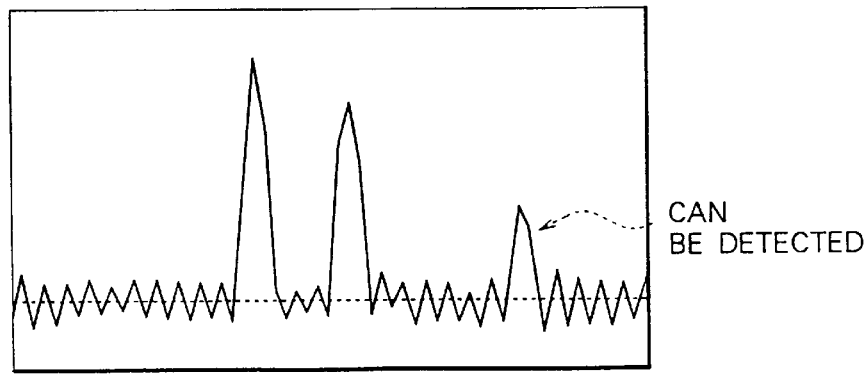

FIG. 5A is a graph showing the result of detection of the PN code in the case of cumulative addition of the orthogonal signals I and Q for 64 chips in the cumulative addition circuits 36 and 37 of the circuit shown in FIG. 4. In the case shown in FIG. 5A, there is insufficient separation of the detected PN code and noise and a peak indicated by the wavy line in, for example, FIG. 5A is inside the noise and cannot be detected.

Where there is no error or difference between the carrier wave signal frequencies $\omega_1$ and $\omega_2$ on the transmission side and reception side, if the orthogonal signals I and Q are cumulatively added for 512 chips in the cumulative addition circuits 26 and 27 of the circuit shown in FIG. 3, the PN code can be separated well as shown in FIG. 5C, and a peak indicated by the broken line in FIG. 5A can be detected.

When assuming that the number of times of cumulative addition in the cumulative addition circuits 36 and 37 shown in FIG. 4 is 64, (for 64 chips) and the number of times of cumulative addition in the cumulative addition circuit 39 is 8, the result of code detection becomes as shown in FIG. 5B.

Although the noise level is not reduced to the extent of the case of setting the number of times of cumulative addition at the cumulative addition circuits 26 and 27 to 512 as shown in FIG. 5C, the dispersion (variation) of noise levels becomes small in comparison with a case where the number of times of cumulative addition at the cumulative addition circuits 36 and 37 is set to 64 as shown in FIG. 5A and the degree of separation of the PN code is improved.

However, so long as the circuit shown in FIG. 4 is used, even if the number of times of cumulative addition of the cumulative addition circuit 39 is increased, only the signal exceeding the average level of noise obtained in the cumulatively added signals ΣI and ΣQ of the cumulative addition circuits 36 and 37 (level of horizontal line indicated by a broken line in FIG. 5B can be separated. Accordingly, the peak indicated by for example the broken line in FIG. 5B cannot be detected.

SECOND EMBODIMENT

Below, a second embodiment of the present invention will be explained.

The effect due to the error or difference between the carrier frequencies $\omega_1$ and $\omega_2$ of the transmission side and the reception side appears as an undulation in the orthogonal signals I and Q.

Figure 6:
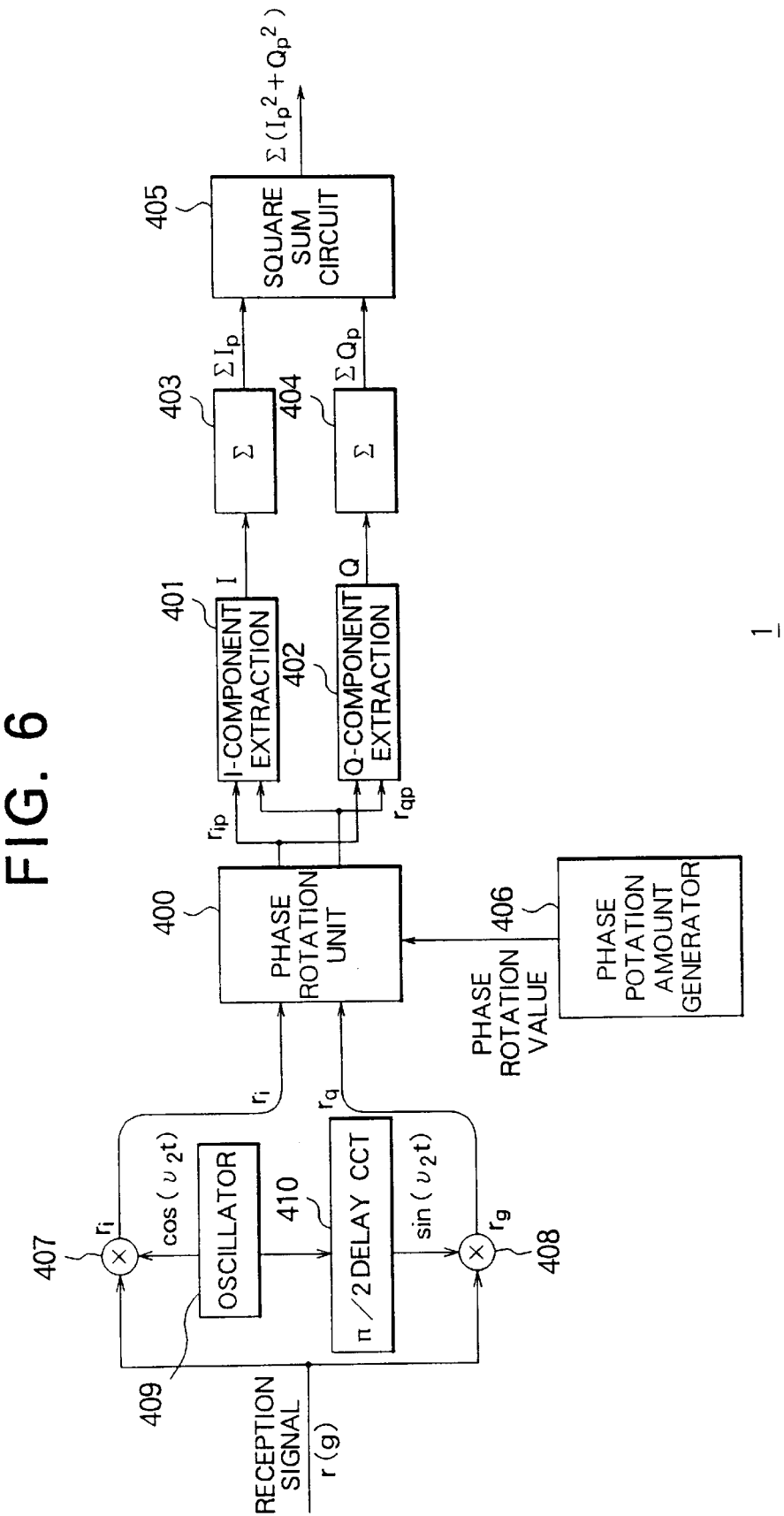
FIG. 6 is a view showing the configuration of a code detection apparatus according to a second embodiment of the present invention.

The code detection apparatus 1 according to the second embodiment of the present invention shown in FIG. 6 eliminates the effect due to the error or difference between the carrier wave signals $\omega_1$ and $\omega_2$ by cancelling the phase rotations of the orthogonal signals I and Q.

To cancel the phase rotations, there is the case of using the method shown in equations 6 and 7 explained in the first embodiment and the case of using the method shown in equations 10 and 11. Below, these methods will be explained.

When modifying equations 6 and 7, the following equations 16 and 17 are obtained.

$$r_i = \sqrt{2} a_1 \cdot \cos(-\Delta\omega t - \alpha) \tag{16}$$

$$r_q = \sqrt{2} a_1 \cdot \sin(-\Delta\omega t - \alpha) \tag{17}$$

Note, $\Delta\omega = \omega_1 - \omega_2$, $\alpha = \pi/4$ ($pn_i = 1, pn_q = 1$);

$-\pi/4$ ($pn_i = 1, pn_q = -1$);

$3\pi/4$ ($pn_i = -1, pn_q = 1$); and $-3\pi/4$ ($pn_i = -1, pn_q = -1$).

Considering a coordinate system using the two orthogonal signal components as coordinate axes, the coordinate $(r_i, r_q)$ using the orthogonal components $r_i$ and $r_q$ as elements moves in a clockwise direction around the origin along with the elapse of time where there is a positive frequency difference ($\omega_1 > \omega_2$). Accordingly, if a rotation in a counterclockwise direction is given to the orthogonal components $r_i$ and $r_q$, this can be cancelled.

$$R_p = AR \tag{18}$$

Note, $R_p$ is a 2×1 matrix, and the elements of $R_p$ are $r_{11} = r_{ip}$ and $r_{21} = r_{qp}$, A is a 2×2 matrix, and the elements of A are:

$a_{11} = \cos(\Delta\omega t)$;

$a_{12} = -\sin(\Delta\omega t)$;

$a_{21} = \sin(\Delta\omega t)$; and $a_{22} = \cos(\Delta\omega t)$.

R is a 2×1 matrix, and the elements of R are $r_{11} = r_i$ and $r_{21} = r_q$.

The orthogonal components $r_{ip}$ and $r_{qp}$ after correction obtained by the above equations are indicated by the following equations. It is seen that the frequency difference $\Delta\omega t$ has been eliminated.

$$r_{ip} = a_1(pn_i \cdot \cos(\psi) + pn_q \cdot \sin(\psi)) \tag{19}$$

$$r_{qp} = a_1(-pn_i \cdot \sin(\psi) + pn_q \cdot \cos(\psi)) \tag{20}$$

The code detection apparatus 1 according to the present invention constituted to eliminate the effect of the frequency difference $\Delta\omega t$ using the principle shown in equation 18 is shown in FIG. 6. Note that, before the code detection apparatus 1 there are placed multipliers 407, 408, oscillator 409, and π/2 phase delay circuit 410 which are substantially identical to the circuits 10, 11, 12 and 13 shown in FIG. 2 etc.

The orthogonal components $r_i$ and $r_q$ of each chip period obtained from the reception signal r(t) by the processing shown in the first embodiment are input to the phase rotation unit 400.

The phase rotation unit 400 rotates the phases of the orthogonal components $r_i$ and $r_q$ by performing the computation shown in equation 18. The orthogonal components $r_{ip}$ and $r_{qp}$ rotated in phase by the phase rotation unit 400 are input to the I-component extraction circuit 401 and the Q-component extraction circuit 402, respectively.

Here, at the phase rotation unit 400, the rotation amounts (frequency difference $\Delta\omega t$) to be given to the orthogonal components $r_i$ and $r_q$ are calculated by the phase rotation amount generator 406 and set in the phase rotation unit 400.

The I-component extraction circuit 401 and the Q-component extraction circuit 402 perform the computations shown in equations 8 and 9 with respect to the orthogonal components $r_{ip}$ and $r_{qp}$, respectively, to generate the orthogonal signals I and Q.

The cumulative addition circuits 403 and 404 sequentially cumulatively add the orthogonal signals I and Q for exactly the predetermined chip section and generate the cumulatively added signals ΣI and ΣQ.

The square sum circuit 405 squares the cumulatively added signals ΣI and ΣQ, adds the squared cumulatively added signals, and sequentially calculates the energy values $(\Sigma I)^2 + (\Sigma Q)^2$ of the cumulatively added signals ΣI and ΣQ.

Below, a modification of the code detection apparatus 1 will be explained.

When modifying equations 10 and 11 explained in the first embodiment, the following equations 21 and 22 are obtained.

$$I = \sqrt{2} a_1 \cdot \cos(-\Delta\omega t - \psi + \pi/4) \tag{21}$$

Note, $\Delta\omega = \omega_1 - \omega_2$.

$$Q = \sqrt{2} a_1 \cdot \sin(-\Delta\omega t - \psi + \pi/4) \tag{22}$$

Note, $\Delta\omega = \omega_1 - \omega_2$.

It is seen from equations 21 and 22 that the coordinates (I, Q) using the two orthogonal signals as coordinate axes and the orthogonal signals I and Q as elements move in the clockwise direction around the origin along with the elapse of time. Accordingly, by giving rotation in the counterclockwise direction to the orthogonal signals I and Q, the phase rotations of the orthogonal signals I and Q can be cancelled.

$$Q=BC \quad (23)$$

Note,

Q is a 2×1 matrix, and the elements of Q are $p_{11}=I_p$ and $p_{21}=Q_p$,

B is a 2×2 matrix, and the elements of B are:
$b_{11}=\cos(\Delta\omega t)$;
$b_{12}=-\sin(\Delta\omega t)$;
$b_{21}=\sin(\Delta\omega t)$; and
$b_{22}=\cos(\Delta\omega t)$, C is a 2×1 matrix, and the elements of C are $c_{11}=I$ and $c_{21}=Q$.

The phase-rotated orthogonal signals $I_p$ and $Q_p$ obtained by equation 23 become those as shown in the following equations 24 and 25 and the frequency difference $\Delta\omega t$ is eliminated.

$$I_p=a_1(\cos(\psi)+\sin(\psi)) \quad (24)$$

$$Q_p=a_1(\cos(\psi)-\sin(\psi)) \quad (25)$$

Accordingly, the difference between the carrier frequencies $\omega_1$ and $\omega_2$ of the transmission side and reception side (frequency difference $\Delta\omega t$) can be cancelled also by the computation shown in equation 23.

Figure 7:
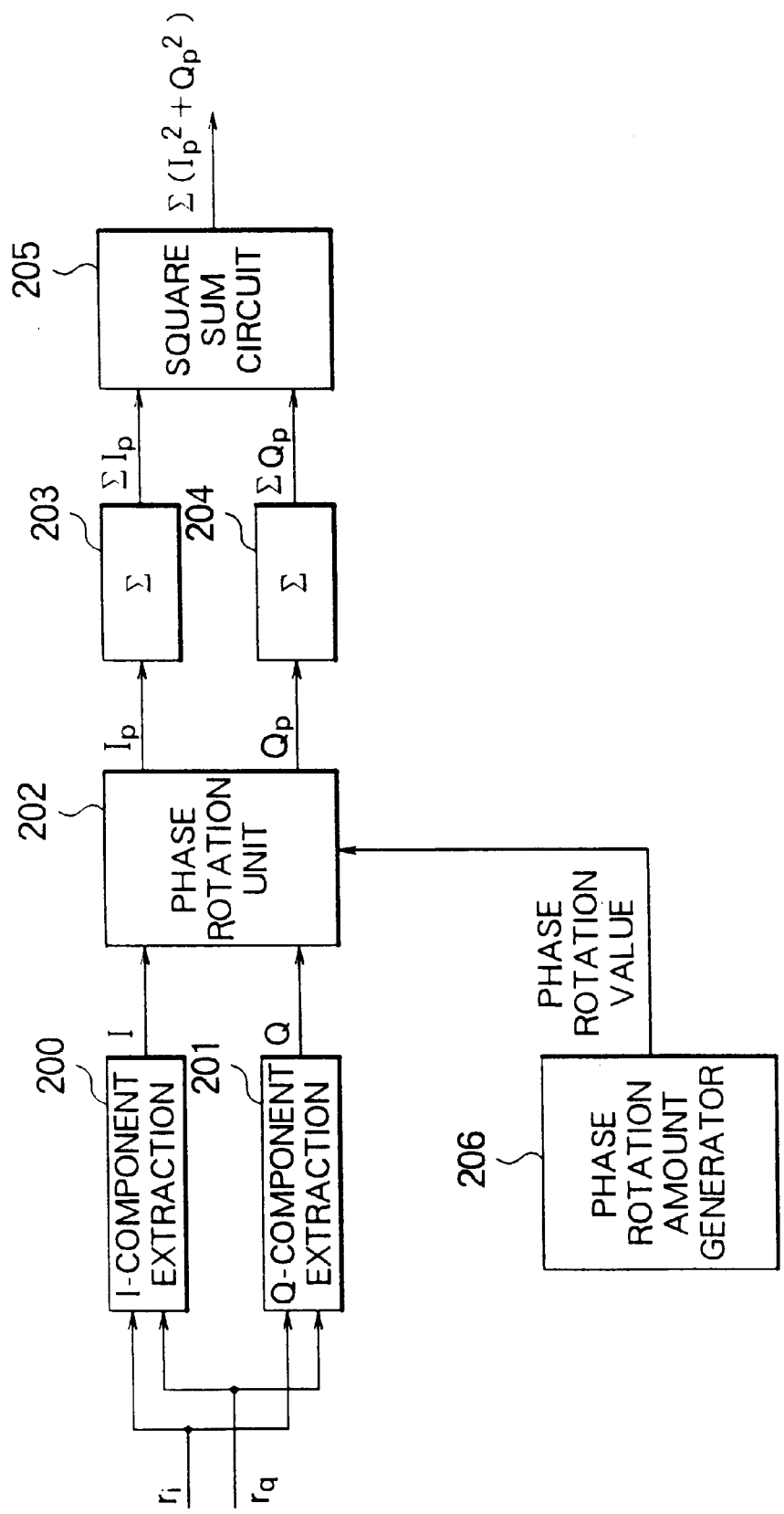
FIG. 7 is a view showing the configuration of a code detection apparatus constituted so as to cancel a frequency difference $\Delta\omega t$ by rotating the phases of the orthogonal signals I and Q.

A code detection apparatus 2 constituted so as to cancel the frequency difference $\Delta\omega t$ by rotating the phases of the orthogonal signals I and Q based on the principle explained above is shown in FIG. 7. Note that, in FIG. 7, the multiplier circuit etc. positioned before the code detection apparatus 2 and shown in FIG. 6 are omitted.

The orthogonal components $r_i$ and $r_q$ of each chip section obtained from the reception signal r(t) are input to the I-component extraction circuit 200 and the Q-component extraction circuit 201, respectively.

The I-component extraction circuit 200 and the Q-component extraction circuit 201 perform the computation shown in equations 8 and 9, respectively, to generate the orthogonal signals I and Q.

The phase rotation unit 202 rotates the phases of the orthogonal signals I and Q by the computation shown in equation 23 and generates the phase-rotated orthogonal signals $I_p$ and $Q_p$).

Here, the phase rotation amount generator 206 calculates the phase rotation value (frequency difference $\Delta\omega t$) in the phase rotation unit 202 and sets the same in the phase rotation unit 202.

The cumulative addition circuits 202 and 203 cumulatively add the phase-rotated orthogonal signals $I_p$ and $Q_p$ for exactly the predetermined chip period and sequentially generate the cumulatively added signals $\Sigma I_p$ and $\Sigma Q_p$.

The square sum circuit 205 squares the cumulatively added signals $\Sigma I_p$ and $\Sigma Q_p$, adds them, and sequentially calculates the energy values $(\Sigma I_p)^2+(\Sigma Q_p)^2$ of the cumulatively added signals $\Sigma I_p$ and $\Sigma Q_p$.

THIRD EMBODIMENT

Below, a third embodiment of the present invention will be explained.

Figure 8:
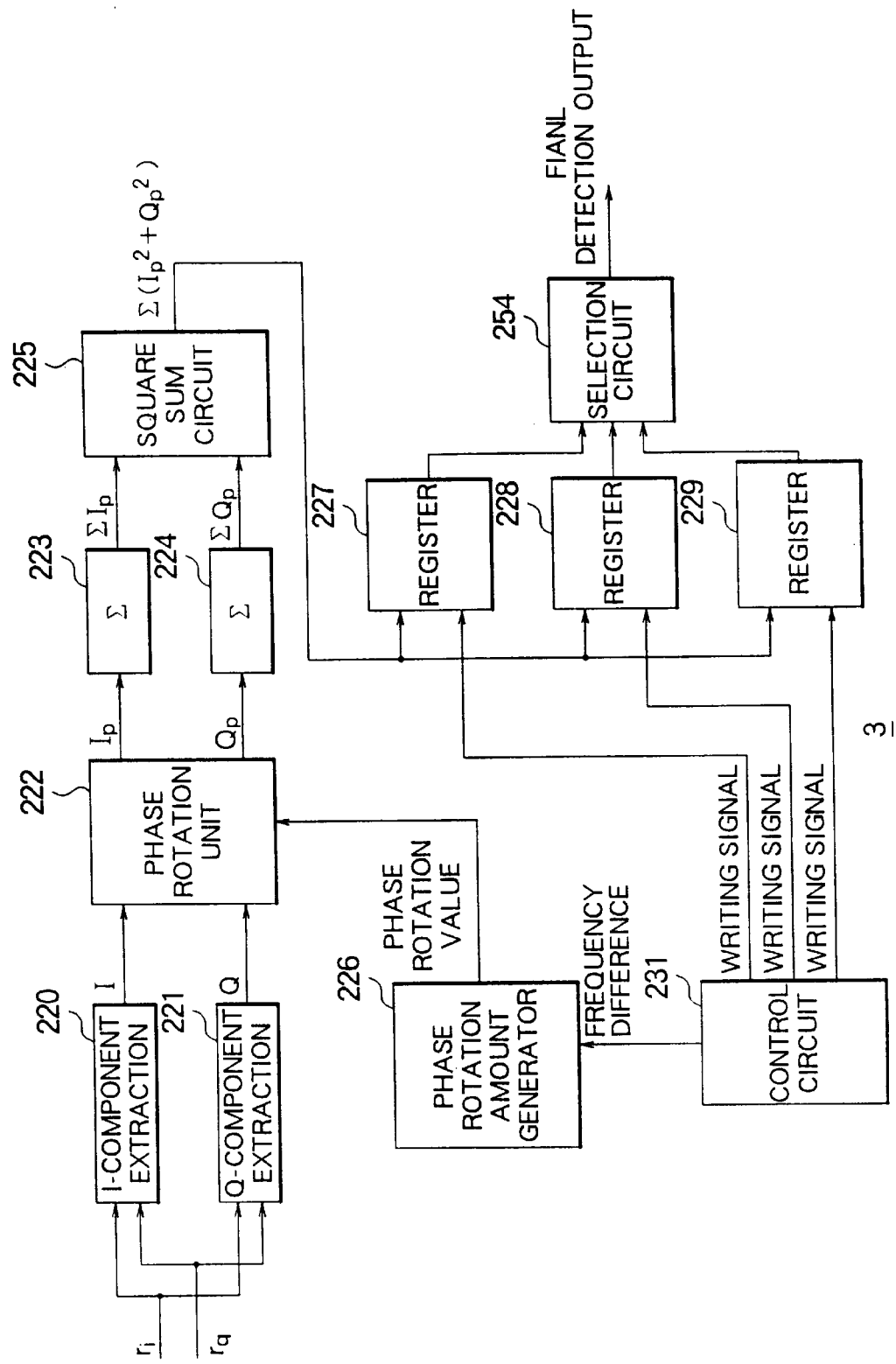
FIG. 8 is a view showing the configuration of a code detection apparatus according to a third embodiment of the present invention.

FIG. 8 is a view showing the configuration of a code detection apparatus 3 according to a third embodiment of the present invention. Note that, similar to the code detection apparatus 2, a circuit producing the orthogonal components $r_i$ and $r_q$ from the reception signal r(t) is positioned before the code detection apparatus 3, but it is omitted in FIG. 8 for simplification of the illustration.

The orthogonal components $r_i$ and $r_q$ obtained from the reception signal r(t) are input to the I-component extraction circuit 220 and Q-component extraction circuit 221, respectively.

The I-component extraction circuit 220 and the Q-component extraction circuit 221 perform the computations shown in equation 8 and 9, respectively, to generate the orthogonal signals I and Q.

The phase rotation unit 222 rotates the phases of the orthogonal signals I and Q by the computation shown in Equation 23 to generate the phase-rotated orthogonal signals $I_p$ and $Q_p$.

Here, the phase rotation amount generator 226 generates the phase rotation amount (frequency difference $\Delta\omega t$ in equation 23) in the phase rotation unit 222 based on the instruction data input from the control circuit 231 and sets the same in the phase rotation unit 222.

The cumulative addition circuits 223 and 224 cumulatively add the orthogonal signals $I_p$ and $Q_p$ for exactly a predetermined chip period respectively to generate the cumulatively added signals $\Sigma I_p$ and $\Sigma Q_p$.

The square sum circuit 225 squares the cumulatively added signals $\Sigma I_p$ and $\Sigma Q_p$, adds the results of the squares, and calculates the energy values $(\Sigma I_p)^2+(\Sigma Q_p)^2$ of the cumulatively added signals $\Sigma I_p$ and $\Sigma Q_p$.

The energy values $(\Sigma I_p)^2+(\Sigma Q_p)^2$ of the cumulatively added signals $\Sigma I_p$ and $\Sigma Q_p$ calculated by the square sum circuit 225 are input to the registers 227, 228, and 229 and respectively stored at timings indicated by writing signals to be input to the registers 227, 228, and 229 from the control circuit 231.

The energy values $(\Sigma I_p)^2+(\Sigma Q_p)^2$ stored in the registers 227, 228, and 229 are input to a selection circuit 230 at a timing indicated by the control circuit 231, and the selection circuit 230 selects an energy value having the largest value among these energy values $(\Sigma I_p)^2+(\Sigma Q_p)^2$ and outputs the same as a final detection output.

Here, the control circuit 231 outputs three types of different instruction data to the phase rotation amount generator 226 for the same PN timing and the phase rotation amount generator 226 sets three types of different phase rotation amounts in the phase rotation unit 222 based on these instruction data.

The phase rotation unit 222 gives three types of different phase rotations to the orthogonal signals I and Q for the same PN timing and outputs three types of phase-rotated orthogonal signals $I_p$ and $Q_p$ to the cumulative addition circuits 223 and 224.

Accordingly, the cumulative addition circuits 223 and 224 and the square sum circuit 225 calculate energy values $(\Sigma I_p)^2+(\Sigma Q_p)^2$ corresponding to these three types of orthogonal signals $I_p$ and $Q_p$ and outputs the same to the registers 227, 228, and 229.

The control circuit 231 adjusts the timing at which the registers 227, 228, and 229 store the orthogonal signals $I_p$ and $Q_p$ by the write signal and makes the register 227 store the energy values $(\Sigma I_p)^2+(\Sigma Q_p)^2$ corresponding to the first orthogonal signals $I_p$ and $Q_p$ among the three types of orthogonal signals $I_p$ and $Q_p$; makes the register 228 store the energy values $(\Sigma I_p)^2+(\Sigma Q_p)^2$ corresponding to the second orthogonal signals $I_p$ and $Q_p$; and makes the register 229 store the energy values $(\Sigma I_p)^2+(\Sigma Q_p)^2$ corresponding to the third orthogonal signals $I_p$ and $Q_p$. As a result, orthogonal signals $I_p$ and $Q_p$ rotated in phase by different phase rotation amounts will be stored in the registers 227, 228, and 229.

The selection circuit 230 selects the largest energy value among these energy values $(\Sigma I_p)^2+(\Sigma Q_p)^2$ stored in the registers 227, 228, and 229, whereby the energy value $(\Sigma I_p)^2+(\Sigma Q_p)^2$ of the orthogonal signals $I_p$ and $Q_p$ optimally phase-rotated in the phase rotation unit 222 is output as the final PN code (final detection output).

By constituting the code detection apparatus 3 as in the above-mentioned way, good detection of the PN code becomes possible even in a case where the frequency difference $\Delta\omega t$ is unknown.

Note that, a case of using three types of phase rotation amounts was shown in the third embodiment, but it is also possible to constitute the system so that the phase rotation with respect to the orthogonal signals I and Q at a further finer interval can be carried out by setting the number of types of the phase rotation amount to two or four or more and suitably changing the number of the registers and control with respect to the registers.

FOURTH EMBODIMENT

Below, a fourth embodiment of the present invention will be explained.

Figure 9:
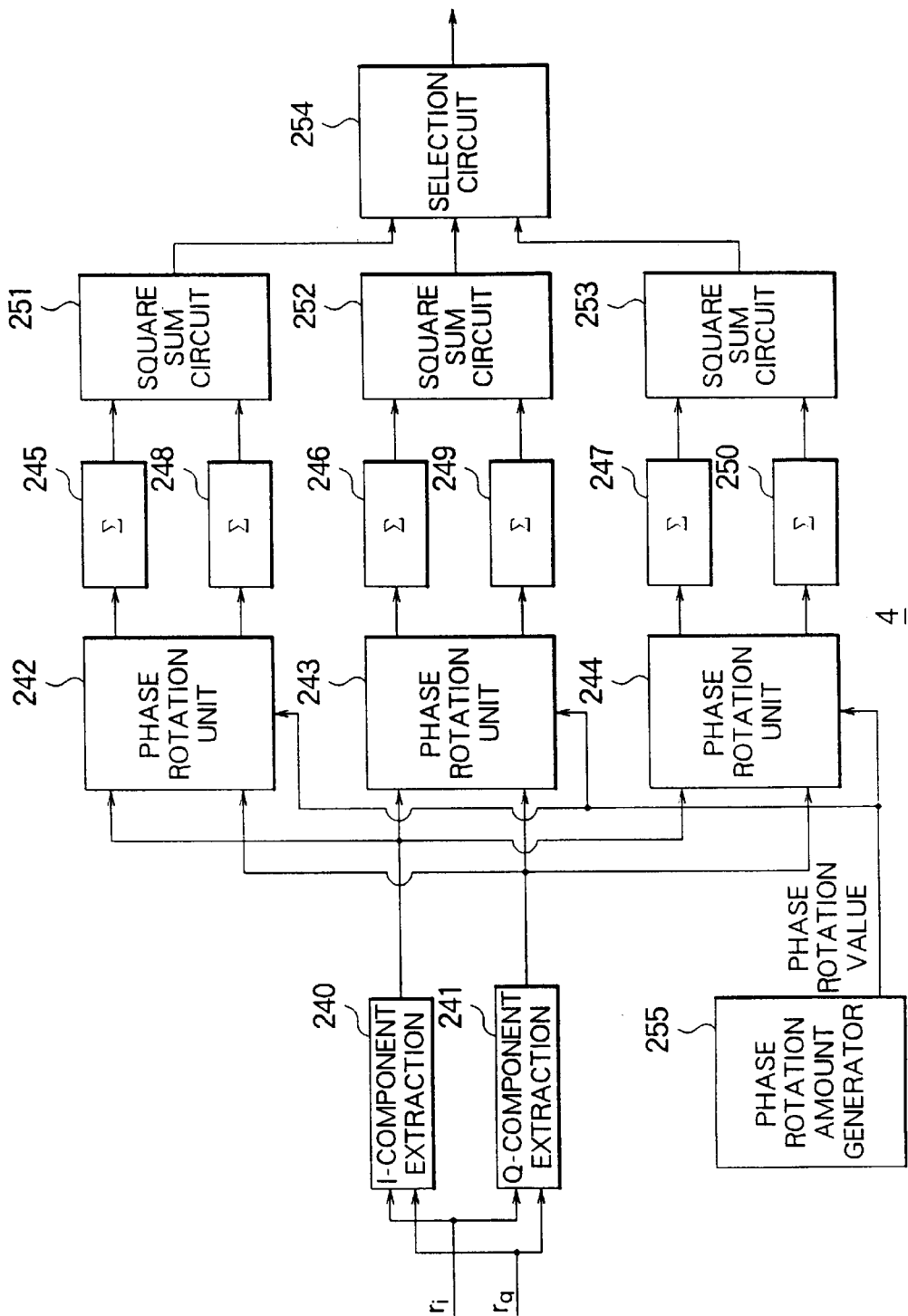
FIG. 9 is a view showing the configuration of a code detection apparatus according to a fourth embodiment of the present invention.

FIG. 9 is a view showing the configuration of a code detection apparatus 4 according to the fourth embodiment of the present invention. Note that, similar to the code detection apparatuses 2 and 3, a circuit producing the orthogonal components $r_i$ and $r_q$ from the reception signal r(t) is positioned before the code detection apparatus 4, but it is omitted in FIG. 9 for the simplification of illustration.

The orthogonal components $r_i$ and $r_q$ obtained from the reception signal r(t) are input to the I-component extraction circuit 240 and the Q-component extraction circuit 241, respectively.

The I-component extraction circuit 240 and the Q-component extraction circuit 241 generate the orthogonal signals I and Q by the computations shown in equations 8 and 9.

The phase rotation units 242, 243, and 244 perform the computations shown in equation 23 by respectively different phase rotation amounts, rotate the phases of the orthogonal signals I and Q, and generate three types of phase-rotated orthogonal signals $I_p$ and $Q_p$.

Note that, the phase rotation amount generator 255 generates three types of different phase rotation amounts (frequency difference $\Delta\omega t$ in equation 23) and sets the respective phase rotation amounts in the phase rotation units 242, 243, and 244.

The cumulative addition circuits 245, 247, and 249 and the cumulative addition circuits 246, 248, and 250 cumulatively add the orthogonal signals $I_p$ and $Q_p$ respectively input from the phase rotation units 242, 243, and 244 for every predetermined chip section and generate the cumulatively added signals $\Sigma I_p$ and $\Sigma Q_p$.

The square sum circuits 251, 252, and 253 respectively generate the energy values $(\Sigma I_p)^2+(\Sigma Q_p)^2$ corresponding to the cumulatively added signals $\Sigma I_p$ and $\Sigma Q_p$ calculated by the cumulative addition circuits 245, 247, and 249 and the cumulative addition circuits 246, 248, and 250, respectively.

The selection circuit 254 outputs the largest energy value among the energy values calculated by the respective square sum circuits 251, 252, and 253 as the final PN code.

Note that, the code detection apparatus 4 has three sets of phase rotation units, cumulative addition circuits, and square sum circuits and is constituted so as to give three types of phase rotation amounts to the orthogonal signals I and Q, but it is also possible to constitute the same so that two sets or four or more sets of these circuits give two types or four or more types of phase rotation amounts to the orthogonal signals I and Q and detect the PN code.

Alternatively, it is also possible to constitute the same so that the phase rotation amount given by one among the phase rotation units to the orthogonal signals I and Q is set to 0. In this case, the phase rotation unit having a phase rotation amount of 0 can be omitted.

FIFTH EMBODIMENT

Below, a fifth embodiment of the present invention will be explained.

Figure 10:
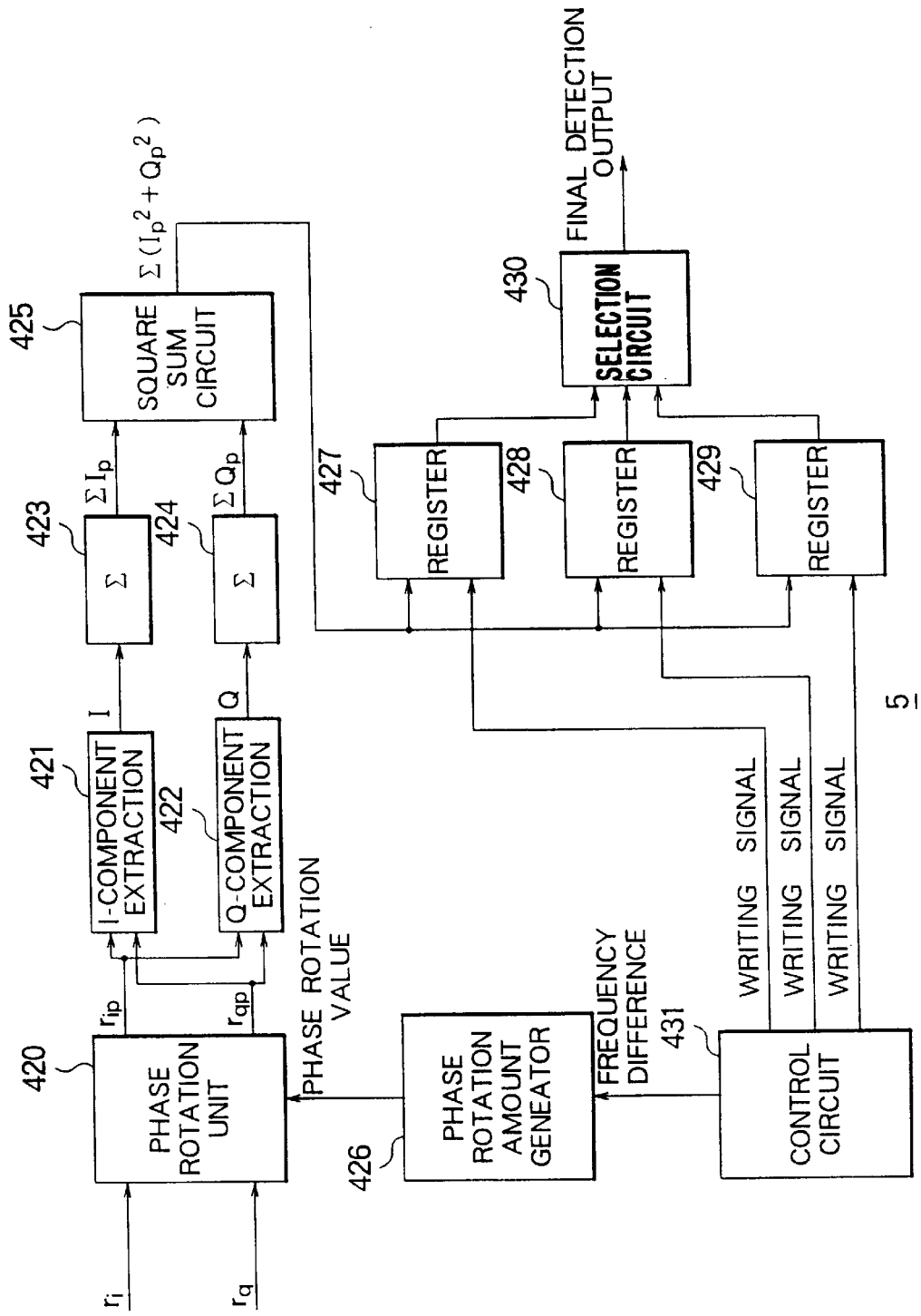
FIG. 10 is a view showing the configuration of a code detection apparatus according to a fifth embodiment of the present invention.

FIG. 10 is a view showing the configuration of a code detection apparatus 5 according to the fifth embodiment of the present invention. Note that, similar to the code detection apparatuses 1 to 4, a circuit producing the orthogonal components $r_i$ and $r_q$ from the reception signal r(t) is positioned before the code detection apparatus 5, but it is omitted in FIG. 10 for the simplification of illustration.

Among the constituent parts of the code detection apparatus 5 shown in FIG. 10, the phase rotation unit 420, the I-component extraction circuit 421, the Q-component extraction circuit 422, cumulative addition circuits 423 and 424, control circuit 431, phase rotation amount generator 426, registers 427, 428, and 429 and the selection circuit 430 correspond to the phase rotation unit 222, I-component extraction circuit 220, Q-component extraction circuit 221, cumulative addition circuits 223 and 224, control circuit 231, phase rotation amount generator 226, registers 227, 228, and 229 and the selection circuit 230 of the code detection apparatus 3 shown in FIG. 8 in the third embodiment, respectively, and perform similar operations.

In this way, the configurations of the code detection apparatus 5 and the code detection apparatus 3 are similar, but different in the point that the positions of the I-component extraction circuit and Q-component extraction circuit and the phase rotation unit are switched with each other.

Below, the operation of the code detection apparatus 5 will be explained.

The orthogonal components $r_i$ and $r_q$ obtained from the reception signal r(t) are input to the phase rotation unit 420.

The control circuit 431 outputs three types of different instruction data to the phase rotation amount generator 426 in the same chip section, and the phase rotation amount generator 426 sets three types of different phase rotation amounts in the phase rotation unit 422 based on these instruction data.

The phase rotation unit 422 gives three types of different phase rotations to the orthogonal components $r_i$ and $r_q$ in the same chip section and outputs three types of phase-rotated orthogonal components $r_{ip}$ and $r_{qp}$ to the cumulative addition circuits 423 and 424, respectively.

The I-component extraction circuit 421, Q-component extraction circuit 422, cumulative addition circuits 423 and 424, and square sum circuit 425 calculate the energy values $(\Sigma I_p)^2+(\Sigma Q_p)^2$ of the orthogonal signals I and Q corresponding to each of these three types of orthogonal components $r_{ip}$ and $r_{qp}$, and these three types of energy values $(\Sigma I_p)^2+(\Sigma Q_p)^2$ are stored in the registers 427, 428, and 429.

The selection circuit 430 outputs the largest energy value among these energy values $(\Sigma I_p)^2+(\Sigma Q_p)^2$ stored in the registers 427, 428, and 429 as the final PN code.

By configuring the code detection apparatus 5 as mentioned above, a performance equivalent to that of the code detection apparatus 3 can be realized.

Note that, the same type of modifications as to the code detection apparatus 3 are possible also with respect to the code detection apparatus 5.

SIXTH EMBODIMENT

Below, a sixth embodiment of the present invention will be explained.

Figure 11:
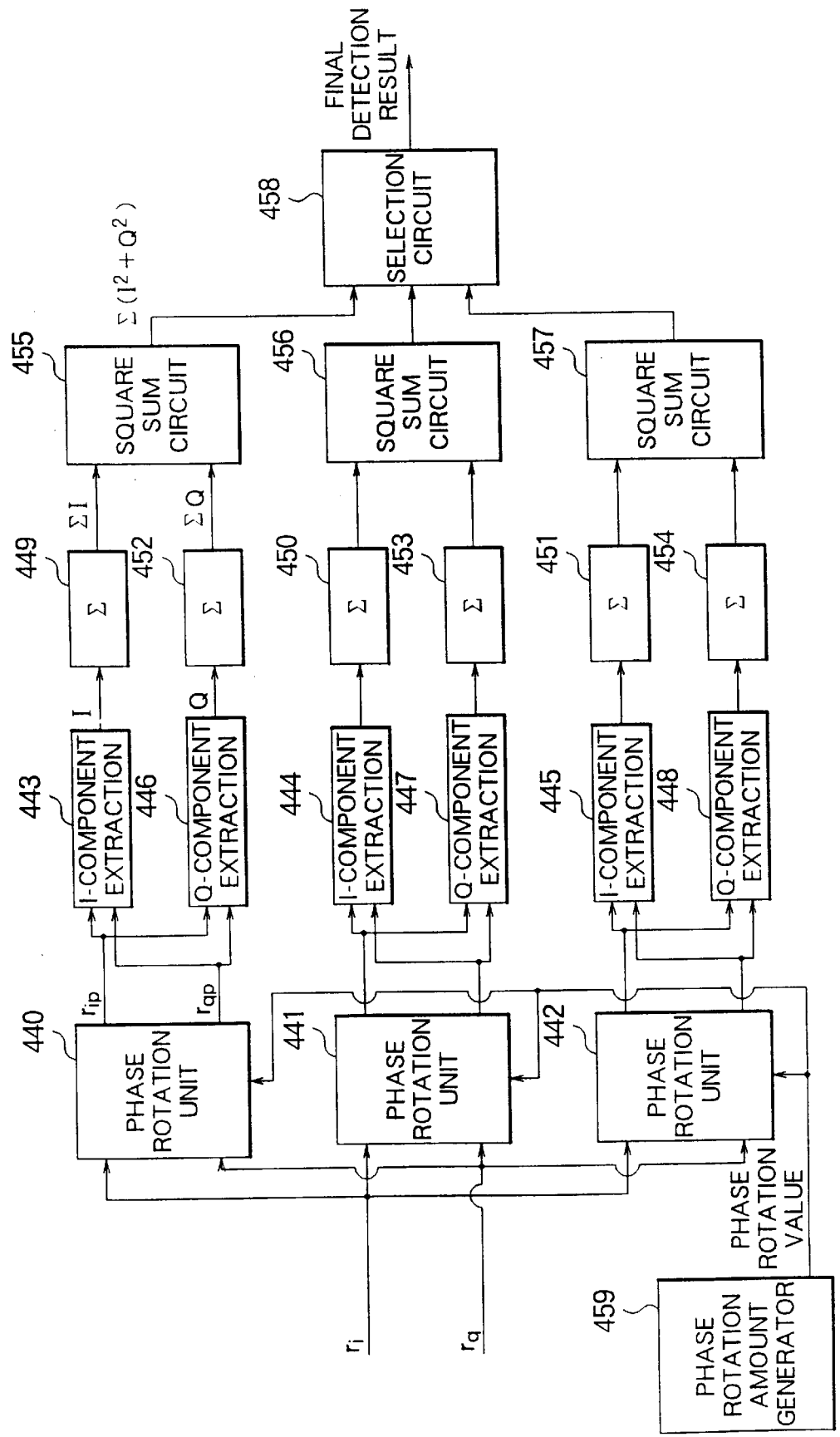
FIG. 11 is a view showing the configuration of a code detection apparatus according to a sixth embodiment of the present invention.

FIG. 11 is a view showing the configuration of a code detection apparatus 6 according to the sixth embodiment of the present invention. Note that, similar to the code detection apparatuses 1 to 5, a circuit producing the orthogonal components $r_i$ and $r_q$ from the reception signal r(t) is positioned before the code detection apparatus 6, but it is omitted in FIG. 11 for the simplification of illustration.

The code detection apparatus 6 shown in FIG. 11 is a modification of the code detection apparatus 4 shown in the fourth embodiment, and the phase rotation units 440, 441, and 442, I-component extraction circuits 443, 444, and 445, Q-component extraction circuits 446, 447, and 448, cumulative addition circuits 449, 450, and 451, cumulative addition circuits 452, 453, and 454, square sum circuits 455, 456, and 457, and the selection circuit 458 of the code detection apparatus 6 correspond to the phase rotation units 242, 243, and 244, I-component extraction circuit 240, Q-component extraction circuit 241, cumulative addition circuits 245, 246, and 247, cumulative addition circuits 248, 249, and 250, square sum circuits 251, 252, and 253 and the selection circuit 254 of the code detection apparatus 4, respectively and perform similar operations.

In this way, the code detection apparatus 6 and the code detection apparatus 4 have similar configurations, but are different in the point that the positions of the I-component extraction circuit and Q-component extraction circuit and the phase rotation unit are switched with each other.

The orthogonal components $r_i$ and $r_q$ obtained from the reception signal r(t) are input to the phase rotation units 440, 441, and 442.

The phase rotation amount generator 459 generates three types of different phase rotation amounts (frequency difference Δωt in equation 23) and sets the phase rotation amounts in the phase rotation units 440, 441, and 442.

The phase rotation units 440, 441, and 442 perform the computations shown in equation 23 with the phase rotation amounts set by the phase rotation amount generator 459, rotate the phases of the orthogonal components $r_i$ and $r_q$, and generate the three types of phase-rotated orthogonal components $r_{ip}$ and $r_{qp}$.

The I-component extraction circuits 443, 444, and 445 and the Q-component extraction circuits 446, 447, and 448 perform the computations shown in equations 8 and 9 with respect to the orthogonal components $r_{ip}$ and $r_{qp}$ input from the phase rotation units 440, 441, and 442, respectively and generate the orthogonal signals I and Q.

The cumulative addition circuits 449, 450, and 451 and the cumulative addition circuits 452, 453, and 454 cumulatively add the orthogonal signals I and Q respectively input from the I-component extraction circuits 443, 444, and 445 and the Q-component extraction circuits 446, 447, and 448 for every predetermined chip section and generate the cumulatively added signals ΣI and ΣQ.

The square sum circuits 455, 456, and 457 generate the energy values $(\Sigma I)^2+(\Sigma Q)^2$ corresponding to the cumulatively added signals ΣI and ΣQ calculated by the cumulative addition circuits 449, 450, and 451 and the cumulative addition circuits 452, 453 and 454, respectively.

The selection circuit 458 outputs the largest energy value among the energy values calculated by the respective square sum circuits 455, 456, and 457 as the final PN code.

Note that modifications similar to those for the code detection apparatus 4 etc. are possible also for the code detection apparatus 6.

SEVENTH EMBODIMENT

Below, a seventh embodiment of the present invention will be explained.

Figure 12:
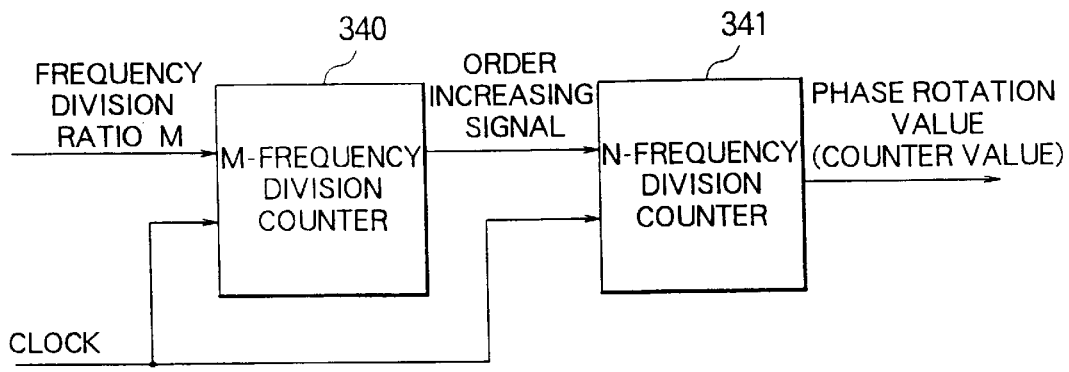
FIG. 12 is a view showing the configuration of a phase rotation amount generator according to a seventh embodiment of the present invention.

FIG. 12 is a view showing the configuration of a phase rotation amount generator 7 according to the seventh embodiment of the present invention.

Figure 13:
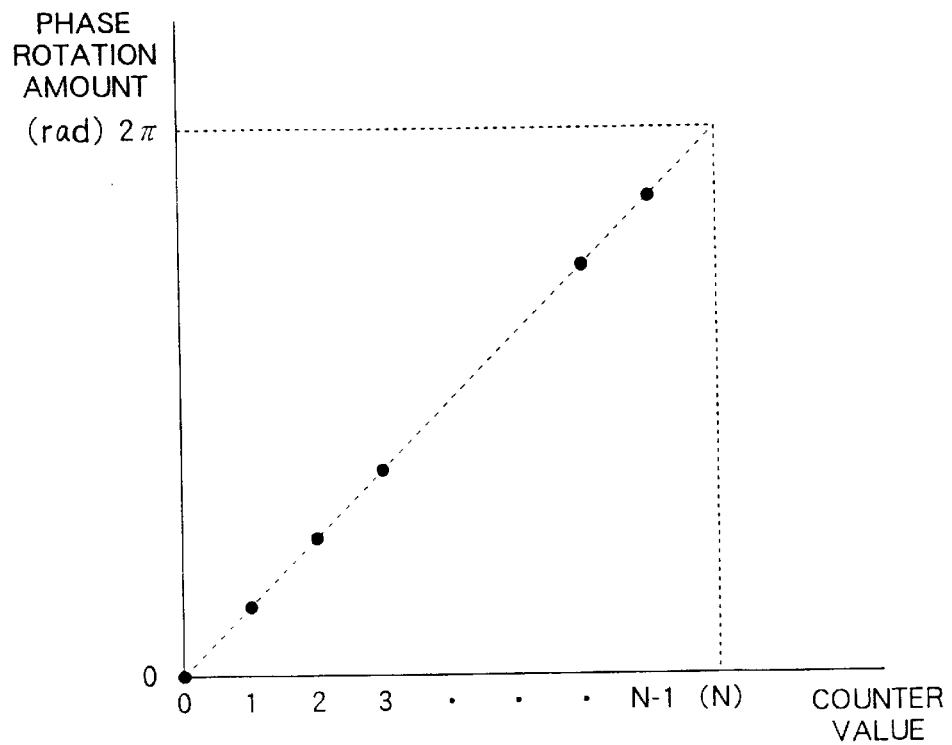
FIG. 13 is a view showing a phase rotation amount generated by the phase rotation amount generator shown in FIG. 12.

FIG. 13 is a view showing the phase rotation amount generated by the phase rotation amount generator 7 shown in FIG. 12.

The phase rotation amount generator 7 is used instead of the phase rotation amount generator 255 in the code detection apparatus 4 shown in FIG. 9 in for example the fourth embodiment.

As shown in FIG. 12, the phase rotation amount generator 7 is constituted by a counter 340 of an initial stage in which a frequency division ratio M is set from the outside and a counter 341 of a next stage having a frequency division ratio of N (M and N are integers), counts up or counts down the count in synchronization with the clock signal synchronized to the chip section of the PN code contained in the reception signal r(t), generates the phase rotation amount to be used in the computation in the phase rotation unit, and sets the same in the phase rotation unit.

The phase rotation value which is generated by the phase rotation amount generator 7 becomes as shown in FIG. 13.

The phase rotation values to be given by the phase rotation unit to the orthogonal signals I and Q or the orthogonal components $r_i$ and $r_q$ become within a range of from 0 to 2π. This phase rotation amount is brought into proportional correspondence with the counts 0 to N−1 of the counter 341. That is, when assuming that the count of the counter 341 is n (0≦n≦N−1, n is an integer), the phase rotation value (frequency difference Δωt in equation 18 etc.) can be expressed as Δωt=2nπ/N.

As mentioned above, the frequency division ratio M of the counter 340 is variable, and the phase rotation value can be adjusted by varying this. That is, when the frequency division ratio of the counter 340 is made small, the counting of the N-frequency division counter becomes fast, and the phase rotation value output from the phase rotation amount generator 7 becomes large.

Also, when the counter 341 is made to count down, it is possible to bring the phase rotation amount generator 7 into correspondence with the negative phase rotation amount.

By giving a two-stage configuration using the counters 340 and 341 to the phase rotation amount generator 7, the count of the counter 341 of the second stage can be always brought into a range of from 0 to N−1, and therefore it is easy to match the inputs and outputs with those of the phase rotation unit.

Also, in comparison with a case where the phase rotation amount generator is constituted by a single stage, the range of the count does not vary along with the change of the frequency division value, and therefore one type of table is sufficient as the table indicating the correspondence between the count and phase rotation amount as shown in FIG. 13.

EIGHTH EMBODIMENT

Below, an eighth embodiment of the present invention will be explained.

Figure 14:
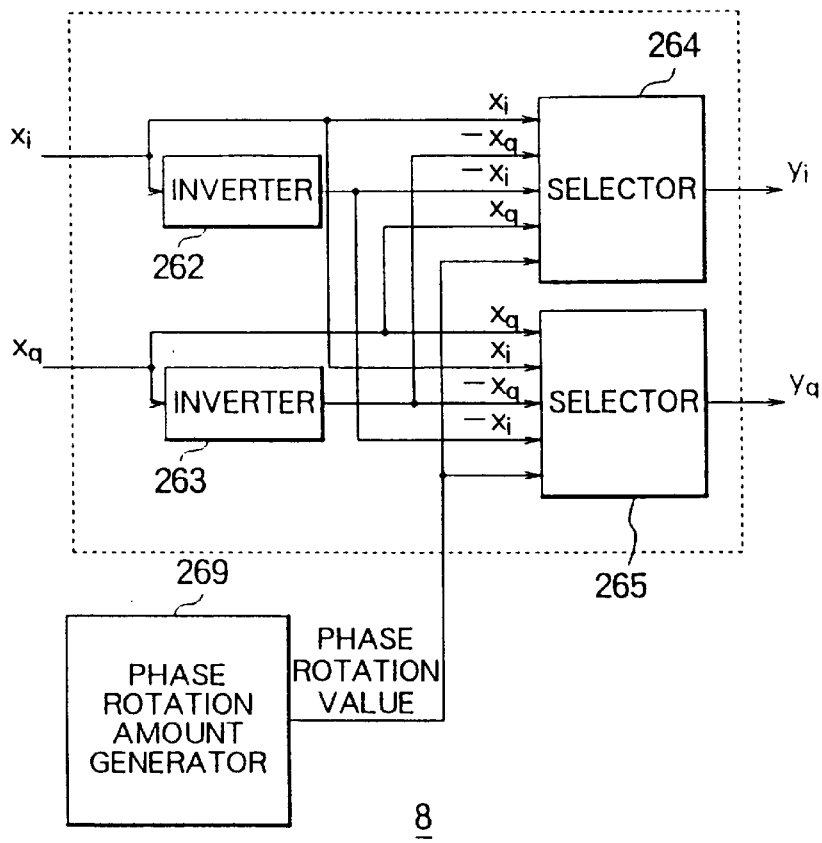
FIG. 14 is a view showing the configuration of a phase rotation unit according to an eighth embodiment of the present invention.

FIG. 14 is a view showing the configuration of the phase rotation unit 8 according to the eighth embodiment of the present invention. The phase rotation unit 8 is a modification simplifying for example the phase rotation unit 222 of the code detection apparatus 3 shown in FIG. 8 in the third embodiment and is used in place of the phase rotation unit 222.

The orthogonal signals I and Q or orthogonal components $r_i$ and $r_q$ (signals $x_i$ and $x_q$) to be rotated in phase by the phase rotation unit 8 are input to the code inversion circuits 262 and 263 and the selectors 264 and 265, respectively.

The code inversion circuits 262 and 263 respectively invert the code of the input signals $x_i$ and $x_q$ and generate the signals $-x_i$ and $-x_q$.

The selectors 264 and 265 select the signals $x_i$, $x_q$, $-x_i$, and $-x_q$ according to the rule shown in Table 1 and output the same as the phase-rotated orthogonal signals $I_p$ and $Q_p$ or orthogonal components $r_{ip}$ and $r_{qp}$ (signals $y_i$, $y_q$).

TABLE 1

Relationship of Phase Rotation Values (2 bits) and Outputs of Phase Rotation Units

| Phase rotation value | Output of selector 264 | Output of selector 265 |
|---|---|---|
| 00 (0) | $x_i$ | $x_q$ |
| 01 ($\pi/2$) | $-x_q$ | $x_i$ |
| 10 ($\pi$) | $-x_i$ | $-x_q$ |
| 11 ($3\pi/4$) | $x_q$ | $-x_i$ |

That is, in the selectors 264 and 265, the 2 bits of phase rotation value data (00) generated by the phase rotation amount generator 269 indicate a phase rotation value of 0 (rad), (01) indicates a phase rotation value of $\pi/2$(rad), (10) indicates a phase rotation value of $\pi$ (rad), and (11) indicates a phase rotation amount of $3\pi/2$ (rad).

This is obtained by assigning 0 (rad), $\pi/2$(rad), $\pi$ (rad), and $3\pi/2$ (rad) for the phase rotation value (frequency difference $\Delta\omega t$) of the phase rotation matrix P expressed by the following equation 26. The components of the phase rotation matrix P are the values of 0 or $\pm 1$, and therefore the configuration of the phase rotation unit 8 has become very simple.

P is a 2×2 matrix, and the elements of P are:
$p_{11}=\cos(\Delta\omega t)$;
$P_{12}=-\sin(\Delta\omega t)$;
$P_{21}=\sin(\Delta\omega t)$;
and $$P_{22}=\cos(\Delta\omega t) \qquad (26)$$

NINTH EMBODIMENT

Below, a ninth embodiment of the present invention will be explained.

Figure 15:
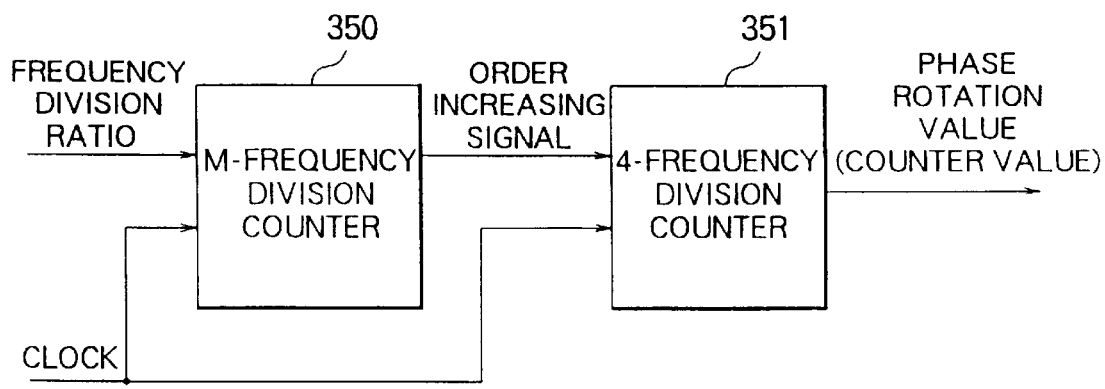
FIG. 15 is a view showing the configuration of a phase rotation amount generator according to a ninth embodiment of the present invention.

FIG. 15 is a view showing the configuration of the phase rotation amount generator 9 according to the ninth embodiment of the present invention. The phase rotation amount generator 9 is a modification of the phase rotation amount generator 7 shown in the seventh embodiment, and the counters 350 and 351 of the phase rotation amount generator 9 correspond to the counters 340 and 341 of the phase rotation amount generator 7 and perform the same operation.

The phase rotation amount generator 9 is replaced by the phase rotation amount generator 226 together with the phase rotation unit 8 shown in FIG. 14 in the eighth embodiment which is used in place of the phase rotation unit 222 in the code detection apparatus 3 shown in FIG. 8 in the third embodiment.

As mentioned above, the phase rotation amount generator 9 is used together with the phase rotation unit 8, and therefore has a configuration adapted to the operation of the phase rotation unit 8, that is, configured by the counter 350 of the initial stage in which the frequency division ratio M is set from the outside and a counter 351 having the frequency division ratio of 4 (M is an integer) and, similar to the phase rotation amount generator 7, counts up or counts down the count in synchronization with the clock signal synchronized to the chip section of the PN code contained in the reception signal r(t), generates the phase rotation amount to be used in the computation in the phase rotation unit, and sets the same in the phase rotation unit.

By using the code detection apparatuses 3 to 6, the phase rotation amount generators 7 and 9, and the phase rotation unit 8 according to the present invention shown in the embodiments explained above, even if an error or difference occurs between the carrier frequencies $\omega_1$ and $\omega_2$ on the transmission side (base station) and the reception side (mobile unit), the mobile unit can reliably detect the PN code transmitted from the base station.

Also, as in the code detection apparatuses 3 and 5 shown in the third to fifth embodiments, by using the set of I-component extraction circuit, Q-component extraction circuit, phase rotation unit, cumulative addition circuit, and square sum circuit (detection apparatus) while varying the phase rotation amount which is set in the phase rotation unit, it is possible to provide a code detection apparatus with a small circuit scale and small power consumption.

On the other hand, by operating a plurality of detection apparatuses in parallel like the code detection circuits 4 and 6 shown in the fourth to sixth embodiments, a high speed code detection apparatus can be provided.

By selecting either of the code detection apparatuses 3 and 5 or the code detection apparatuses 4 and 6 for use according to the intended purpose, the code detection apparatus according to the present invention can handle a wide range of purposes.

Note that, the carrier wave frequency $\omega_2$ generated by the mobile unit has an error or difference from the carrier wave frequency $\omega_1$ of the base station during the period after the mobile unit side starts the reception until the synchronization is established. After this, an error or difference which becomes a problem is not produced in these frequencies.

Accordingly, where the code detection apparatuses 3 and 5 are used, synchronization is established between the transmission side and the reception side. Until the demodulation of valid data other than the PN code is commenced, the detection apparatus is operated a plurality of times by a setting corresponding to the respective frequency differences. Where the data demodulation of valid data starts and the frequency difference is eliminated, the code detection apparatuses 3 and 5 are modified so as to achieve a setting corresponding to this state, whereby the PN code detection time after this can be shortened.

Also, where the code detection apparatuses 4 and 6 are used, after the demodulation of data starts, it is possible to reduce the power consumption by operating only the detection apparatus corresponding to a case where there is no frequency difference.

Figure 16:
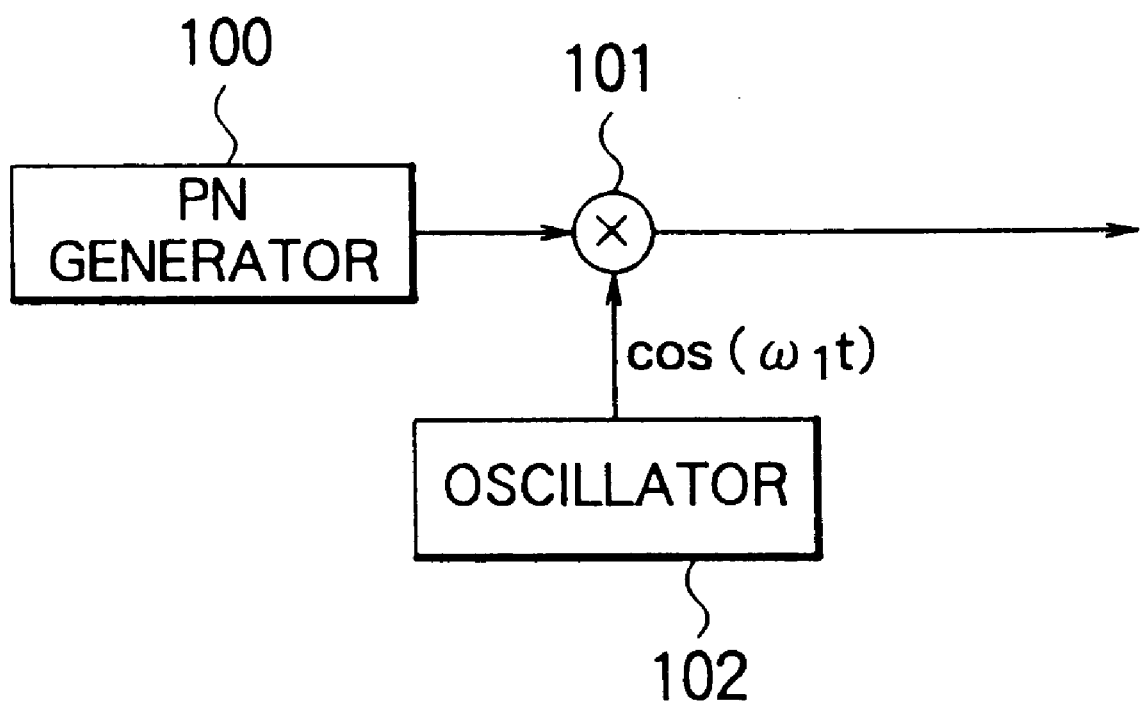
FIG. 16 is a view showing a circuit for transmitting a signal of the 2-phase PSK system.

Note that, in the above explained embodiments, a case where the base station of a CDMA cellular communication system transmits a pilot signal by using the circuit shown in FIG. 1 was explained, but even in a case where the signal of a 2-phase PSK system is transmitted by the circuit shown in FIG. 16, the code can be detected in the same way as with the code detection apparatuses 3 to 6 by a modification within the range of the technical idea of the present invention.

As mentioned above, according to the code detection apparatus according to the present invention, the calculation error in the initial stage of the processing for detection of synchronization between a base station and mobile unit of a CDMA cellular type communication system etc. can be reduced and the detection and holding of the synchronization can be carried out well.

Also, according to the code detection apparatus according to the present invention, the code detection can be carried out at a high speed and with a low power consumption.

What is claimed is:

1. A code detection apparatus comprising:

detection means for orthogonally detecting a spread spectrum modulated reception signal and producing respective orthogonal components;

a phase rotation amount generator for generating a phase rotation amount signal representing a desired frequency compensation;

a phase rotation unit receiving said orthogonal components from said detection means and said phase rotation amount signal for rotating a respective phase of said orthogonal components to generate rotated phase orthogonal components $r_{ip}$, $r_{qp}$;

an I-component extraction circuit and a Q-component extraction circuit each receiving said rotated phase orthogonal components for respectively generating two orthogonal signals (I, Q); and cumulative square summation means receiving said two orthogonal signals and for cumulatively adding each of said orthogonal signals (I, Q) a predetermined number of times, and calculating square sums $(\Sigma I)^2+(\Sigma Q)^2$ of said cumulatively added orthogonal signals (I, Q) to produce a square sum signal for use in detecting a code of said spread spectrum modulated reception signal based on said calculated square sums $(\Sigma I)^2+(\Sigma Q)^2$ obtained by changing the amount of the phase rotation.

2. A code detection apparatus as set forth in claim 1, wherein an increment of change for phase rotation in said phase rotation unit is in units of $\pi/2$ (rad).

3. A code detection method, including the steps of:

orthogonally detecting a spread spectrum modulated reception signal and producing respective orthogonal components;

generating a phase rotation amount signal representing a desired frequency rotation;

rotating the phase by using said phase rotation amount signal to rotate said orthogonal components to generate rotated phase orthogonal components ($r_{ip}$, $r_{qp}$, extracting an I component and a Q component from said rotated phase orthogonal components and generating respective orthogonal signals (I, Q);

cumulatively adding said orthogonal signals (I, Q) a predetermined number of times; and calculating square sums $(\Sigma I)^2+(\Sigma Q)^2$ of said cumulatively added orthogonal signals (I, Q) for subsequent use in detecting a code of said spread spectrum modulated reception signal based on said calculated square sums $(\Sigma I)^2+(\Sigma Q)^2$ obtained by changing an amount of phase rotation provided in said step of rotating the phase.

4. A code detection method as set forth in claim 3, wherein the calculated square sums $(\Sigma I)^2+(\Sigma Q)^2$ are stored.

5. A code detection apparatus as set forth in claim 4, wherein an increment of change for phase rotation is in units of $\pi/2$ (rad) and including a further step of inverting codes of the orthogonal components by $\pi/2$ (rad) phase change.

6. A code detection method as set forth in claim 3, wherein a plurality of phase rotation amounts are simultaneously given to the orthogonal components (I, Q).

7. A code detection method as set forth in claim 6, wherein an increment of change for phase rotation is in units of $\pi/2$ (rad) and including a further step of inverting codes of the orthogonal components by $\pi/2$ (rad) phase change.

8. A code detection method as set forth in claim 3, wherein an increment of change for phase rotation is in units of $\pi/2$ (rad).

* * * * *